(12) United States Patent
Izumi et al.

(10) Patent No.: US 9,912,627 B2
(45) Date of Patent: *Mar. 6, 2018

(54) GENERATION AND TRANSMISSION OF EVENT NOTIFICATION CONTENT BASED ON SCORE

(71) Applicant: SONY CORPORATION, Tokyo (JP)

(72) Inventors: Akihiko Izumi, Kanagawa (JP); Naoyuki Sato, Tokyo (JP); Koichi Kawasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,460

(22) Filed: Sep. 9, 2016

(65) Prior Publication Data

US 2016/0380948 A1  Dec. 29, 2016

Related U.S. Application Data

(63) Continuation of application No. 14/665,663, filed on Mar. 23, 2015, now Pat. No. 9,462,434.

(30) Foreign Application Priority Data

Mar. 31, 2014  (JP) ................. 2014-071168

(51) Int. Cl.
| | | |
|---|---|---|
| H04M 1/725 | (2006.01) | |
| H04L 12/58 | (2006.01) | |
| H04W 4/12 | (2009.01) | |
| H04L 29/08 | (2006.01) | |
| H04W 4/02 | (2018.01) | |
| H04W 12/02 | (2009.01) | |
| G06K 9/00 | (2006.01) | |

(52) U.S. Cl.
CPC .......... *H04L 51/24* (2013.01); *G06K 9/00228* (2013.01); *H04L 51/12* (2013.01); *H04L 67/12* (2013.01); *H04W 4/023* (2013.01); *H04W 4/12* (2013.01); *H04W 12/02* (2013.01)

(58) Field of Classification Search
None
See application file for complete search history.

(56) References Cited

FOREIGN PATENT DOCUMENTS

| JP | 05-241992 A | 9/1993 |
|---|---|---|
| JP | 2003-046635 A | 2/2003 |
| JP | 2005-236615 A | 9/2005 |
| JP | 2008-270912 A | 11/2008 |

*Primary Examiner* — Adolf Dsouza
(74) *Attorney, Agent, or Firm* — Chip Law Group

(57) ABSTRACT

There is provided an information processing apparatus including a transmission control unit, a reception control unit, and a display request generation unit. The transmission control unit is configured to transmit a third condition to an apparatus configured to provide a notification. The reception control unit is configured to receive a score from the apparatus, in an event it is determined that the third condition is satisfied, wherein the score is indicative of a degree of satisfaction of the third condition. The display request generation unit is configured to generate an event notification content, wherein the transmission control unit is further configured to transmit the event notification content to the apparatus based on the received score.

11 Claims, 20 Drawing Sheets

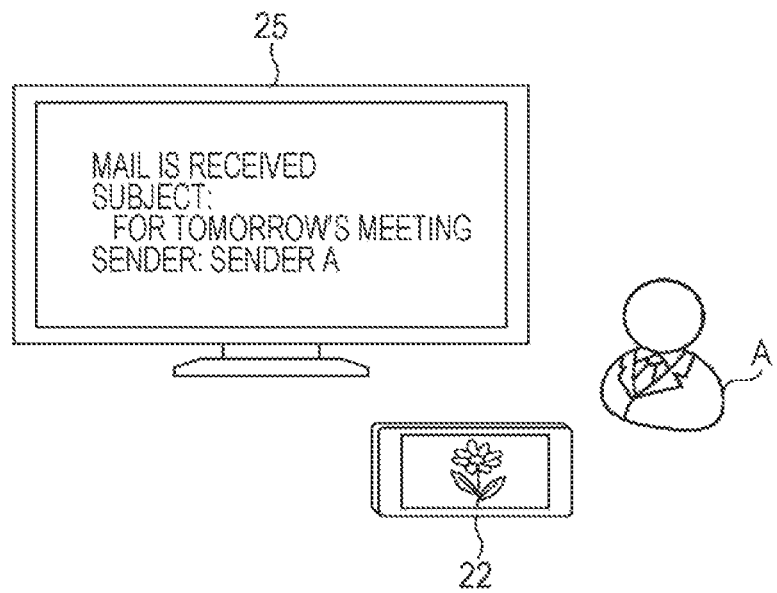
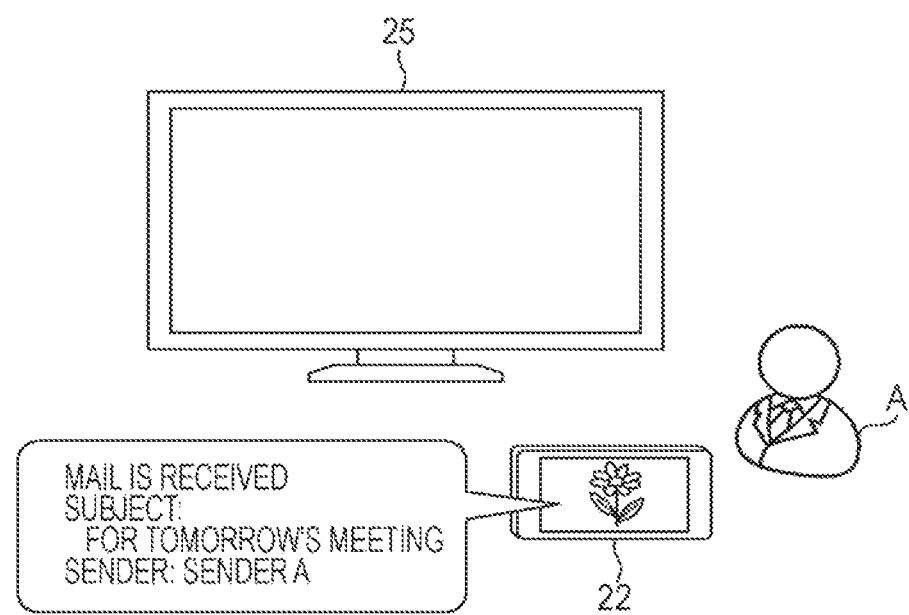

FIG. 18

| No. | USER ID | FACIAL FEATURE QUANTITY | WHETHER OR NOT PRIVACY INFORMATION IS DISPLAYABLE, SCORE | WHETHER OR NOT TO SECURELY NOTICE, SCORE | APPARATUS CATEGORY |
|---|---|---|---|---|---|
| 1 | Abcd | NONE | DISPLAYABLE, 50 | IT IS SLIGHTLY DIFFICULT TO NOTICE, 100 | SMALL SCREEN |
| 2 | Ijkl | NONE | NOT DISPLAYABLE | DO NOT NOTICE | SMALL SCREEN |
| 3 | Qrst | NONE | NOT DISPLAYABLE | DO NOT NOTICE | SMALL SCREEN |

GENERATION AND TRANSMISSION OF EVENT NOTIFICATION CONTENT BASED ON SCORE

CROSS REFERENCE TO RELATED APPLICATIONS

The present disclosure is a continuation of U.S. patent application Ser. No. 14/665,663 filed in USPTO on Mar. 23, 2015 which claims priority from Japanese Priority Patent Application JP 2014-071168 filed in the Japan Patent Office on Mar. 31, 2014. Each of the above referenced applications is hereby incorporated by reference in its entirety.

BACKGROUND

The present disclosure relates to an information processing apparatus, an information processing method, and a program. More specifically, the present disclosure relates to an information processing apparatus, an information processing method, and a program which provide notification of event generation to a user using an appropriate apparatus when a prescribed event is generated.

As electronic mails have come into use, terminals capable of receiving such an electronic mail have come into use. There are terminals which have a function of providing notification of reception of an electronic mail to a user.

Japanese Unexamined Patent Application Publication No. 5-241992 discloses an apparatus which causes a preset apparatus to perform display for providing notification of reception of a mail when the mail is received by a mail address destination which is set for a prescribed terminal.

Japanese Unexamined Patent Application Publication No. 2008-270912 discloses an apparatus which performs display in consideration of privacy when it is determined that a person other than a user, to which notification is provided, is present in the vicinity of the user to which notification of reception of a mail is provided.

Japanese Unexamined Patent Application Publication No. 2005-236615 and Japanese Unexamined Patent Application Publication No. 2003-46635 disclose vehicle telephones which determine whether or not to display a call originator based on whether or not a fellow passenger is present.

SUMMARY

In Japanese Unexamined Patent Application Publication No. 5-241992, notification is displayed in the preset apparatus. Therefore, when, for example, a television receiver is set to the apparatus which displays notification, notification of reception of a mail is displayed on the television receiver. In such a case, if a plurality of users are watching the television receiver, the notification is provided to users other than a notification target user, and thus there is a possibility that privacy is not maintained.

In Japanese Unexamined Patent Application Publication No. 2008-270912, Japanese Unexamined Patent Application Publication No. 2005-236615, and Japanese Unexamined Patent Application Publication No. 2003-46635, it is possible to provide notification while privacy is maintained. However, if, for example, information of a sender or a subject is not presented to a user, the user does not determine whether or not the mail has urgency, and thus there is a possibility that the information is not appropriate for information to be presented.

It is desirable to enable privacy to be protected and enable an appropriate apparatus to provide notification of prescribed event generation to a user.

According to an embodiment of the present disclosure, there is provided a first information processing apparatus including: a search unit that searches for an apparatus, which is suitable for providing event notification, when event generation is detected; and a supply unit that supplies notification content to the apparatus which is found by the search unit.

The search unit may search for an apparatus which is in a state capable of displaying privacy information and for which there is a strong possibility that a user notices the notification.

The search unit may issue a response request for responding to a search target apparatus when a third condition, which includes a first condition relevant to display of the privacy information and a second condition relevant to whether or not the user notices the notification, is satisfied, and may set an apparatus, which has the highest score for satisfying the third condition, to an apparatus, which is suitable for providing the event notification, from among apparatuses which respond to the response request.

A plurality of third conditions may be set by combining the first condition and the second condition, priorities are allocated based on a preferable condition, the response request is issued to the apparatus in order of higher priorities, and the response request may be issued under the third condition of subsequent priority when there is no apparatus which responds.

The response request may include information for specifying a notification target user.

The search unit may transmit information for specifying a notification target user to a search target apparatus, may receive a score indicative of a degree of satisfying the condition, which includes a first condition relevant to display of the privacy information and a second condition relevant to whether or not the user notices the notification, from the apparatus, and may set an apparatus which has the highest score as an apparatus, which is suitable for providing the event notification.

The search unit may issue a response request for responding whether or not it is possible to provide notification to the search target apparatus, may receive a table in which scores indicative of a degree of satisfying a condition, which includes a first condition relevant to display of privacy information and a second condition relevant to whether or not a user notices the notification, are written with regard to an apparatus which responds to the response request, and may search for an apparatus, which has the highest score for the notification target user, with reference to the table, and set the found apparatus as an apparatus which is suitable for providing the event notification.

The search unit may search for another apparatus when the found apparatus is restricted in the amount of displayable information, and the supply unit may supply the notification content to each of a plurality of apparatuses.

According to another embodiment of the present disclosure, there is provided a first information processing method including: searching for an apparatus, which is suitable for providing event notification, when event generation is detected; and supplying notification content to the found apparatus.

According to still another embodiment of the present disclosure, there is provided a first computer-readable program causing a computer to perform a process including: searching for an apparatus, which is suitable for providing event notification, when event generation is detected; and supplying notification content to the found apparatus.

In the first information processing apparatus, the first information processing method, and the first program according to another embodiment of the present disclosure, the apparatus, which is suitable for providing event notification, is searched for when the event generation is detected; and the notification content is supplied to the found apparatus.

According to still another embodiment of the present disclosure, there is provided a second information processing apparatus including: a reception unit that receives a third condition, which includes a first condition relevant to display of privacy information and a second condition relevant to whether or not a user notices notification, from an apparatus which detects event generation; a transmission unit that transmits a score indicative of a degree of satisfying the third condition to the apparatus when it is determined that the third condition is satisfied; and a notification unit that provides notification to the user when notification content is received from the apparatus.

The score may include at least a score indicative of a degree of whether or not it is possible to display the privacy information, and a score indicative of a degree of a possibility that a notification target user notices the notification.

The reception unit may receive the third condition in a state in which a plurality of third conditions are set by combining the first condition and the second condition, priorities are allocated based on a preferable condition, and a response request is issued in order of high priorities, and may receive the third condition, which is issued in a subsequent priority, again when there is no apparatus which responds.

According to still another embodiment of the present disclosure, there is provided a second information processing method including: receiving a third condition, which includes a first condition relevant to display of privacy information and a second condition relevant to whether or not a user notices notification, from an apparatus which detects event generation; transmitting a score indicative of a degree of satisfying the third condition to the apparatus when it is determined that the third condition is satisfied; and providing the notification to the user when notification content is received from the apparatus.

According to still another embodiment of the present disclosure, there is provided a second computer-readable program causing a computer to perform a process including: receiving a third condition, which includes a first condition relevant to display of privacy information and a second condition relevant to whether or not a user notices notification, from an apparatus which detects event generation; transmitting a score indicative of a degree of satisfying the third condition to the apparatus when it is determined that the third condition is satisfied; and providing the notification to the user when notification content is received from the apparatus.

In the second information processing apparatus, the second information processing method, and the program according to another embodiment of the present disclosure, the third condition, which includes the first condition relevant to display of the privacy information and the second condition relevant to whether or not the user notices notification, is received from the apparatus which detects the event generation; the score indicative of the degree of satisfying the third condition is transmitted to the apparatus when it is determined that the third condition is satisfied; and the notification is provided to the user when the notification content is received from the apparatus.

According to still another embodiment of the present disclosure, there is provided a third information processing apparatus including: a reception unit that receives information for specifying a user, to which notification of event generation is provided, from an apparatus which detects event generation; a calculation unit that calculates respective degrees of satisfying a first condition relevant to display of privacy information and a second condition relevant to whether or not the user who is specified using the information notices notification; a transmission unit that transmits a score which is calculated by the calculation unit; and a notification unit that provides notification to the user when notification content is received from the apparatus.

According to still another embodiment of the present disclosure, there is provided a third information processing method including: receiving information for specifying a user, to which notification of event generation is provided, from an apparatus which detects the event generation; calculating respective degrees of satisfying a first condition relevant to display of privacy information and a second condition relevant to whether or not the user who is specified using the information notices notification; transmitting a calculated score; and providing notification to the user when notification content is received from the apparatus.

In the third information processing apparatus and the third information processing method according to another embodiment of the present disclosure, the information for specifying a user, to which notification of event generation is provided, is received from an apparatus which detects the event generation; the respective degrees of satisfying the first condition relevant to display of privacy information and the second condition relevant to whether or not the user who is specified using the information notices notification are calculated; the calculated score is transmitted; and notification is provided to the user when notification content is received from the apparatus.

According to still another embodiment of the present disclosure, there is provided a fourth information processing apparatus including: a reception unit that receives a response request relevant to whether or not it is possible to provide notification of event generation from an apparatus which detects the event generation; a response unit that responds to the response request when it is possible to provide the notification; a preparation unit that prepares a table in which scores, acquired by respectively calculating degrees of satisfying a first condition relevant to display of privacy information and a second condition relevant to whether or not a prescribed user notices the notification, are written as a result of the response; a transmission unit that transmits the table prepared by the preparation unit to the apparatus; and a notification unit that provides notification to the user when notification content is received from the apparatus.

According to still another embodiment of the present disclosure, there is provided a fourth information processing method including: receiving a response request relevant to whether or not it is possible to provide notification of event generation from an apparatus which detects the event generation; responding to the response request when it is possible to provide the notification; preparing a table in which scores, acquired by respectively calculating degrees of satisfying a first condition relevant to display of privacy information and a second condition relevant to whether or not a prescribed user notices the notification, are written as a result of the response; transmitting the prepared table to the apparatus; and providing notification to the user when notification content is received from the apparatus.

According to still another embodiment of the present disclosure, there is provided a third computer-readable program causing a computer to perform a process including: receiving a response request which indicates whether or not it is possible to provide notification of event generation from an apparatus which detects the event generation; responding to the response request when it is possible to provide the notification; preparing a table in which scores, acquired by respectively calculating degrees of satisfying a first condition relevant to display of privacy information and a second condition relevant to whether or not a prescribed user notices the notification, are written as a result of the response; transmitting the prepared table to the apparatus; and providing notification to the user when notification content is received from the apparatus.

In the fourth information processing apparatus, the fourth information processing method, and the third program, the response request relevant to whether or not it is possible to provide notification of the event generation is received from the apparatus which detects the event generation; the response request is responded to when it is possible to provide the notification; the table, in which scores acquired by respectively calculating the degrees of satisfying the first condition relevant to display of the privacy information and the second condition relevant to whether or not the prescribed user notices the notification are written as a result of the response, is prepared; the prepared table is transmitted to the apparatus; and notification is provided to the user when the notification content is received from the apparatus.

According to the embodiments of the present disclosure, it is possible to protect privacy and to cause an appropriate apparatus to provide notification of prescribed event generation to a user.

Meanwhile, the advantages described here are not necessarily limited, and may include any of the advantages described in the present disclosure.

BRIEF DESCRIPTION OF THE DRAWINGS

FIG. 6 is a diagram illustrating selection of an apparatus which is suitable for providing notification;

FIG. 7 is a diagram illustrating selection of an apparatus which is suitable for providing notification;

FIG. 18 is a diagram illustrating a list;

DETAILED DESCRIPTION OF EMBODIMENTS

Figure 1:
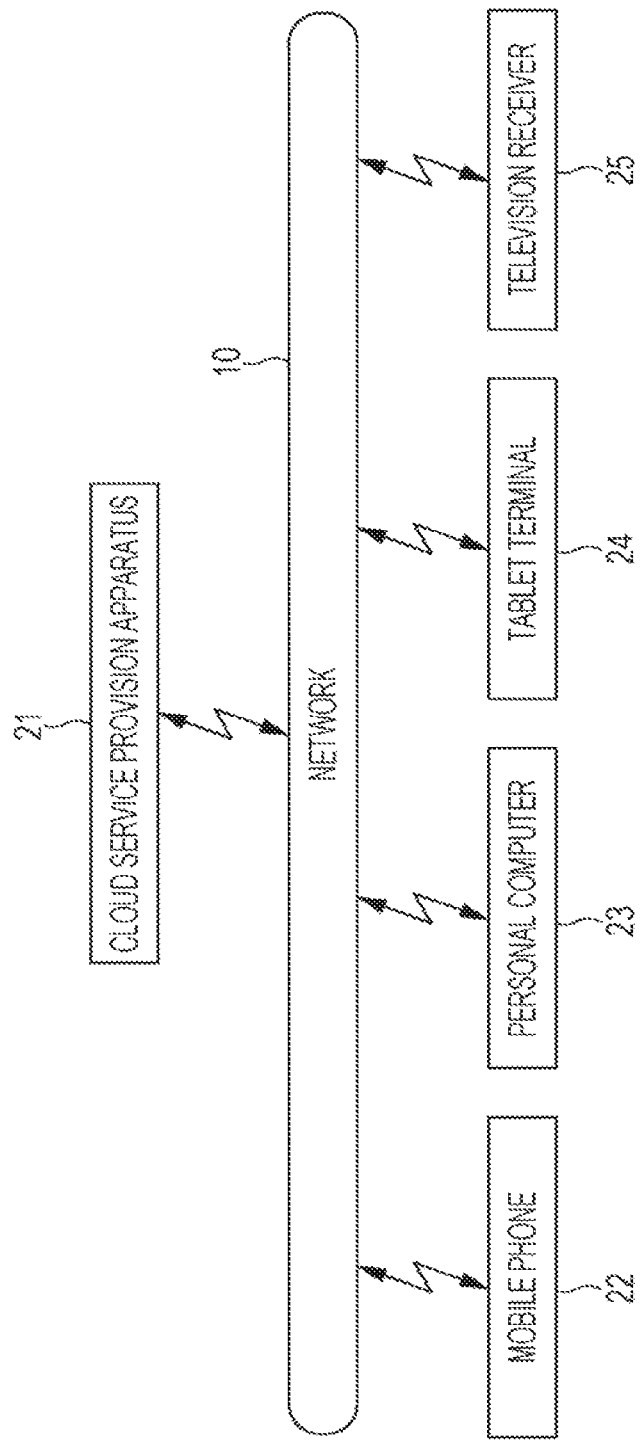
FIG. 1 is a diagram illustrating the configuration of a system according to an embodiment of the present disclosure.

Hereinafter, forms (hereinafter, referred to as "embodiments") to achieve the present disclosure will be described. Meanwhile, description will be made in the following order.
1. Configuration of system
2. Configuration and function of terminal
3. Method of providing notification
4. Operation of system according to first embodiment
5. Operation of terminal according to first embodiment
6. Operation of system according to second embodiment
7. Operation of terminal according to second embodiment
8. Operation of system according to third embodiment
9. Function of terminal according to third embodiment
10. Operation of terminal according to third embodiment
11. Operation of terminal according to fourth embodiment
Configuration of System FIG. 1 is a diagram illustrating the configuration of a system according to an embodiment of the present disclosure. The system shown in FIG. 1 is configured in such a way that a cloud service provision apparatus 21, a mobile phone 22, a personal computer 23, a tablet terminal 24, and a television receiver 25 are connected to a network 10.

The network 10 is formed in wired or wireless manner or formed by a combination thereof, and includes the Internet, a Local Area Network (LAN), or the like. The cloud service provision apparatus 21, the mobile phone 22, the personal computer 23, the tablet terminal 24, and the television receiver 25, which are connected through the network 10, transmit or receive data, respectively.

The cloud service provision apparatus 21 is not a user-side apparatus, and is an apparatus that provides a prescribed service to an apparatus which is connected to the network 10. Although details will be described later, here, it is assumed that the cloud service provision apparatus 21 is an apparatus which manages a user ID or the like and provides the user ID or the like when a request is made.

The mobile phone 22, the personal computer 23, the tablet terminal 24, and the television receiver 25 are user-side terminals, and apparatuses which are operated by a user. Meanwhile, here, description will be continued while it is assumed that the mobile phone 22 and the tablet terminal 24 are terminals which can be carried by the user and that the personal computer 23 and the television receiver 25 are apparatuses which are basically installed in prescribed positions in the house of the user.

Configuration and Function of Terminal

Figure 2:
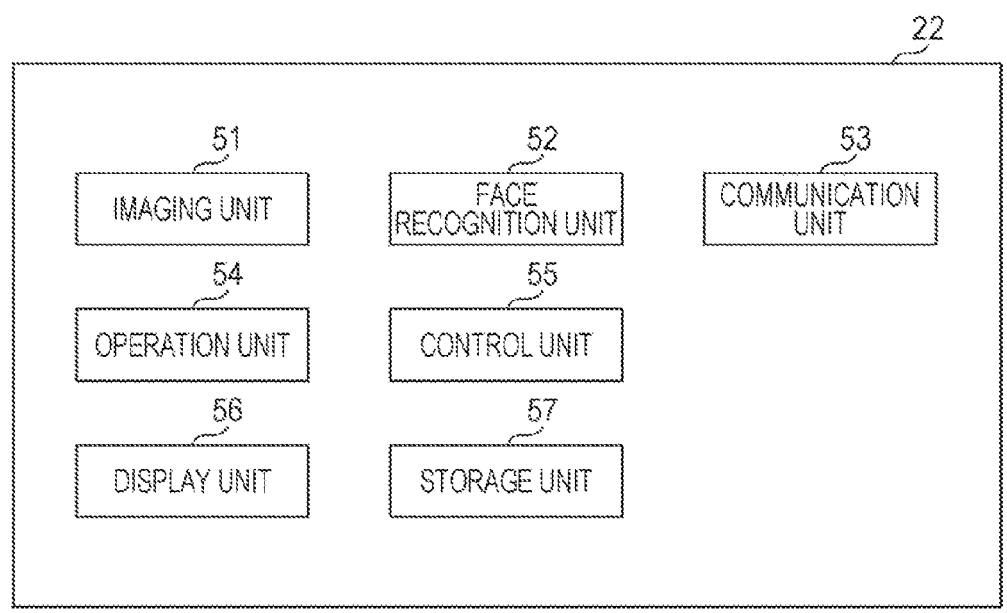
FIG. 2 is a diagram illustrating the configuration of a mobile phone.

FIG. 2 is a diagram illustrating the internal configuration of the mobile phone 22. The mobile phone 22 includes an imaging unit 51, a face recognition unit 52, a communication unit 53, an operation unit 54, a control unit 55, a display unit 56, and a storage unit 57.

The imaging unit 51 has a camera, and images the face of a user or the like. The face recognition unit 52 recognizes the face of a subject in an image which is imaged by the imaging unit 51. The communication unit 53 performs communication for realizing the function of a telephone as the mobile phone 22 or communication for transmitting and receiving data to and from another apparatus through the network 10. Here, description will be continued based on the communication unit 53 which mainly transmits and receives data through the network 10.

Although not shown in the drawing, the operation unit 54 includes, for example, a plurality of keys including numeric keys, and is operated when the user inputs letters or numbers or when the user instructs performing of imaging using the imaging unit 51. The control unit 55 controls each of the units in the mobile phone 22. The display unit 56 includes a display, and shows information to the side of the user. The storage unit 57 stores data or stores an application or the like, as necessary.

Figure 3:
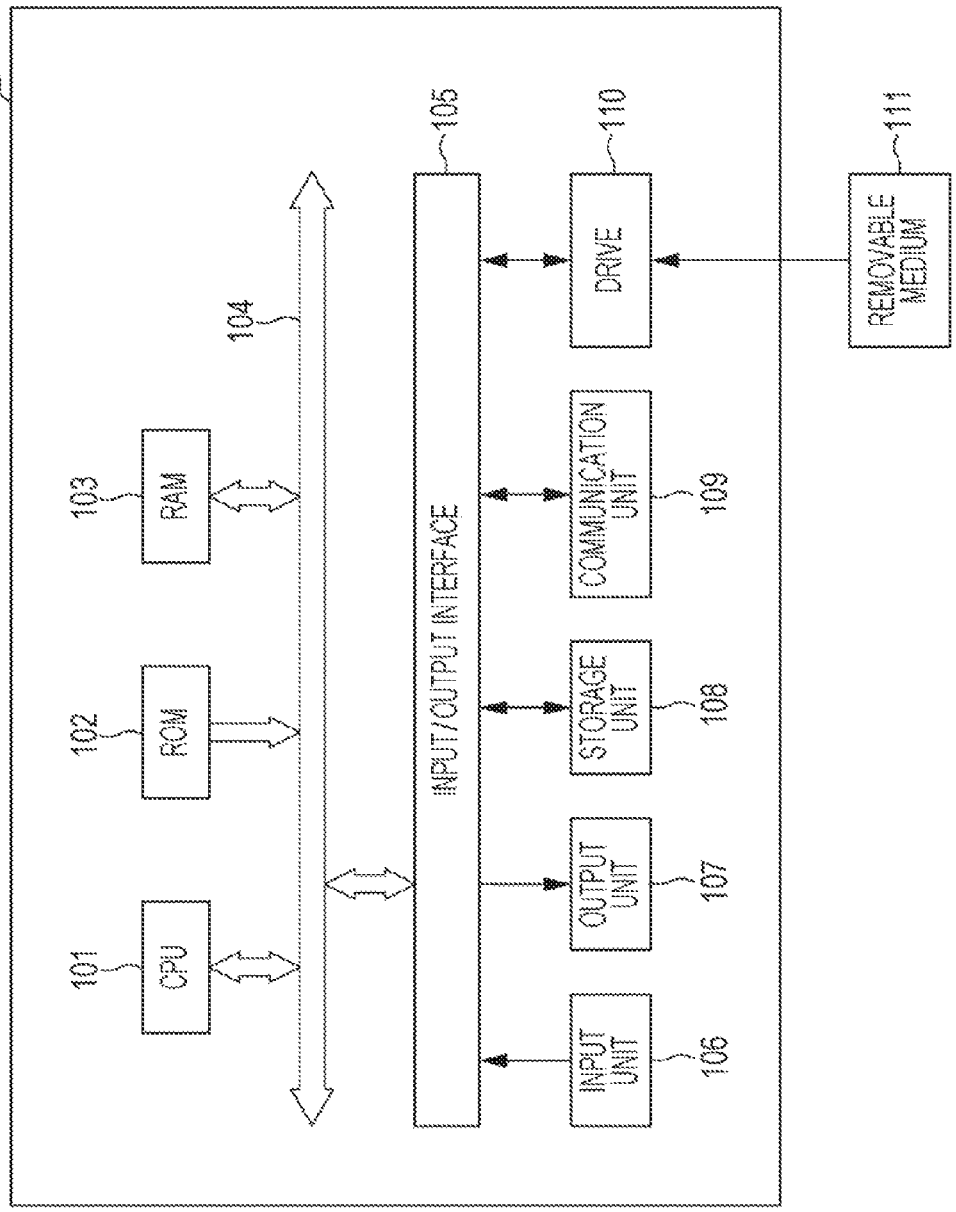
FIG. 3 is a diagram illustrating the configuration of a personal computer.

FIG. 3 illustrates the configuration of the personal computer 23. In the personal computer 23, a Central Processing Unit (CPU) 101, a Read Only Memory (ROM) 102, and a Random Access Memory (RAM) 103 are connected to each other through a bus 104. Further, an input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a nonvolatile memory, and the like. The communication unit 109 includes a network interface or the like. The drive 110 drives a removable medium 111 such as a magnetic disk, an optical disc, a magneto-optical disc, or a semiconductor memory.

In the computer which is formed as above, the above-described series of processes are performed in such a way that the CPU 101 loads, for example, a program which is stored in the storage unit 108 to the RAM 103 through the input/output interface 105 and the bus 104 and executes the program.

The program which is executed by the CPU 101 can be provided after being stored in, for example, the removable medium 111 as a package medium. In addition, the program can be provided through a wired or wireless transmission medium such as a local area network, the Internet, or a digital satellite service.

In the personal computer 23, the program can be installed in the storage unit 108 through the input/output interface 105 by mounting the removable medium 111 on the drive 110. In addition, the program can be received by the communication unit 109 through the wired or wireless transmission medium, and can be installed in the storage unit 108. In addition, the program can be installed in the ROM 102 or the storage unit 108 in advance.

Since the tablet terminal 24 basically has the same configuration as the personal computer 23, the description thereof will not be repeated here. In addition, since the cloud service provision apparatus 21 can be formed using the personal computer 23, it is assumed that the cloud service provision apparatus 21 has the same configuration as the personal computer 23 here, and thus the description thereof will not be repeated.

Figure 4:
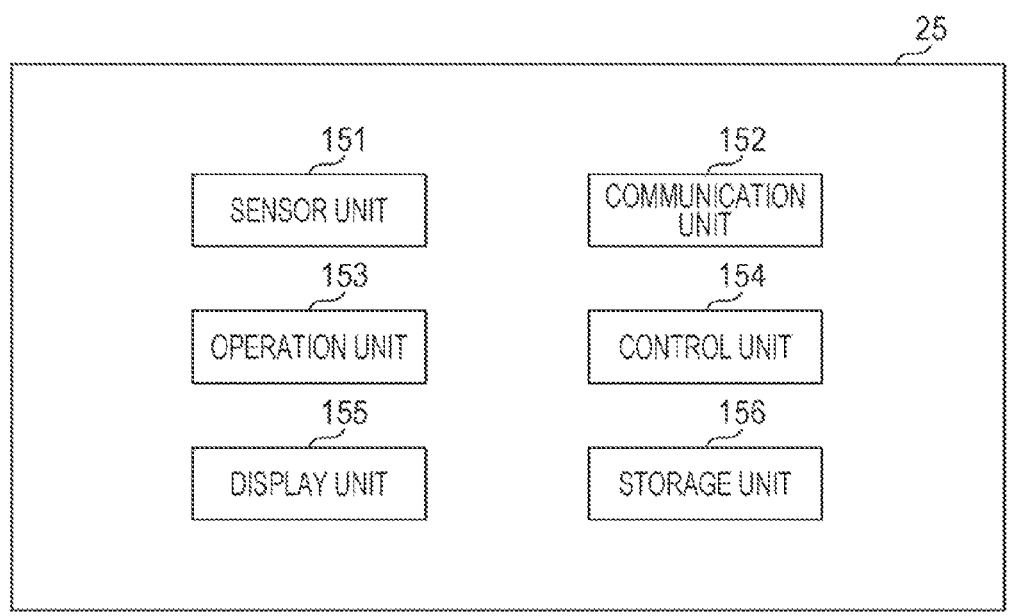
FIG. 4 is a diagram illustrating the configuration of a television receiver.

FIG. 4 illustrates the inner configuration of the television receiver 25. The television receiver 25 includes a sensor unit 151, a communication unit 152, an operation unit 153, a control unit 154, a display unit 155, and a storage unit 156.

The sensor unit 151 is, for example, a sensor which detects whether or not a person is present in front of the television receiver 25. For example, when it is detected that a person is not present in front of the television receiver 25 by the sensor unit 151, control is performed such that a mode proceeds to a power saving mode.

The communication unit 152 performs communication such as transmission or reception of data to or from another apparatus through the network 10. Although not shown in the drawing, the operation unit 153 includes, for example, a plurality of keys including numeric keys, and includes a remote controller or the like which is operated when the user wants to instruct a channel number desired to be viewed.

The control unit 154 controls each of the units in the television receiver 25. The display unit 155 includes a display, and shows information to the side of the user. The storage unit 156 stores data or stores an application or the like, as necessary. Meanwhile, although not shown in the drawing, the television receiver 25 includes, for example, a tuner or the like in order to function as the television receiver 25.

Figure 5:
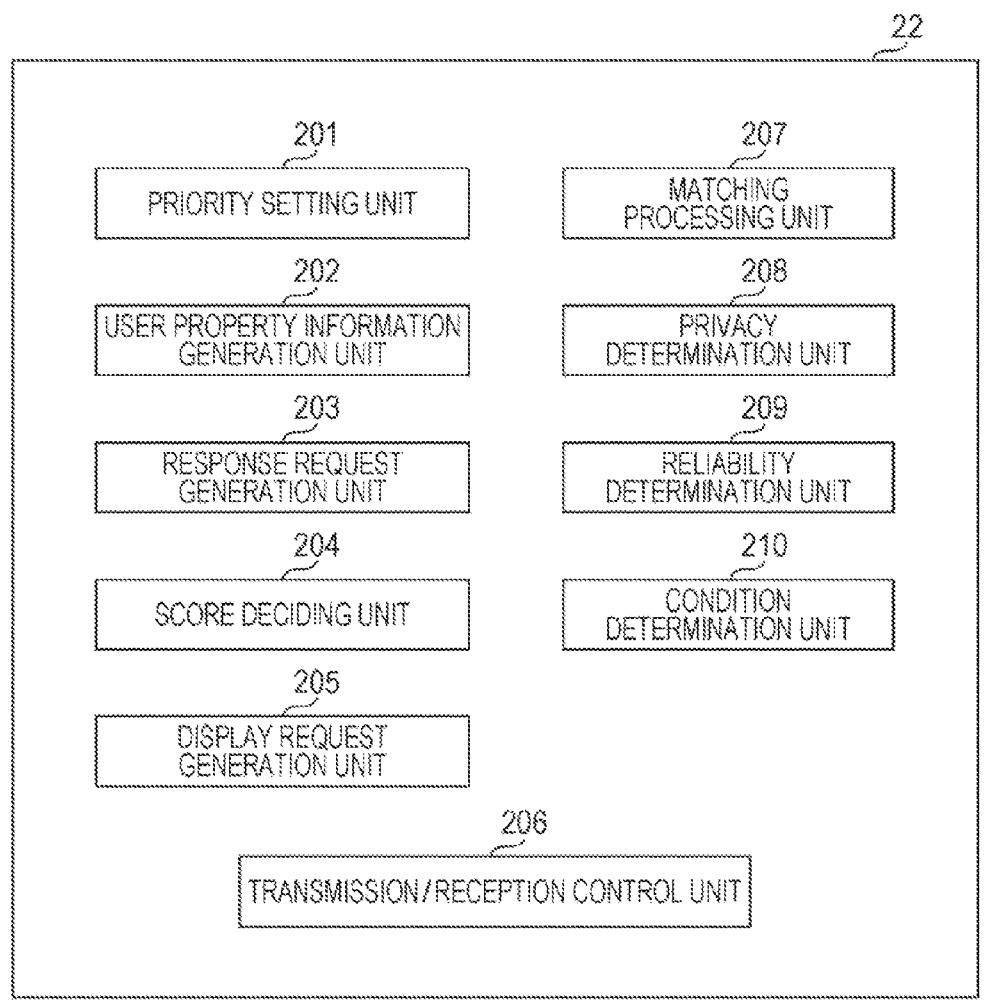
FIG. 5 is a diagram illustrating the function of the mobile phone.

FIG. 5 is a diagram illustrating respective functions of the mobile phone 22, the personal computer 23, the tablet terminal 24, and the television receiver 25.

Although details will be described later, when one apparatus of the mobile phone 22, the personal computer 23, the tablet terminal 24, and the television receiver 25 detects, for example, prescribed event generation in a system as shown in FIG. 1, display is performed on any one apparatus of the mobile phone 22, the personal computer 23, the tablet terminal 24, and the television receiver 25 in order to notify the event generation to the user.

In order to realize such display, each of the mobile phone 22, the personal computer 23, the tablet terminal 24, and the television receiver 25 has functions as shown in FIG. 5. Here, description will be continued while the mobile phone 22 has the functions shown in FIG. 5.

The mobile phone 22 includes a priority setting unit 201, a user specification information generation unit 202, a response request generation unit 203, a score deciding unit 204, a display request generation unit 205, a transmission/reception control unit 206, a matching processing unit 207, a privacy determination unit 208, a reliability determination unit 209, and a condition determination unit 210.

The priority setting unit 201, the user specification information generation unit 202, the response request generation unit 203, the score deciding unit 204, and the display request generation unit 205 have functions causing the mobile phone 22 to detect the prescribed event generation and to provide notification to the user by the mobile phone 22 or another apparatus.

The matching processing unit 207, the privacy determination unit 208, the reliability determination unit 209, and the condition determination unit 210 have functions causing another apparatus to detect the prescribed event generation and causing the mobile phone 22 to generate information for performing determination of whether or not it is possible to provide notification to the user.

As above, when the event generation is detected, the mobile phone 22 has a function of performing a process of providing notification of the event generation to the user using an appropriate apparatus, and a function of generating information for causing the apparatus, which detects the event generation, to determine whether or not the apparatus is a suitable apparatus to perform display.

The event includes, for example, reception of an electronic mail, incoming call of a telephone, notification of a schedule time which is recorded in a schedule, and notification of a starting time of a program reserved for viewing.

For example, the mobile phone 22 has a function of receiving an electronic mail. Therefore, when the mobile phone 22 receives an electronic mail, the mobile phone 22 functions as an apparatus which detects event generation. For example, the television receiver 25 determines whether or not the television receiver 25 is an apparatus which is suitable for providing notification according to the instruction from the mobile phone 22, and functions as an apparatus which generates information.

In addition, for example, at a time at which a program, which is set in the television receiver 25 and is reserved for viewing, the television receiver 25 functions as an apparatus which detects event generation, and for example, the mobile phone 22 determines whether or not the mobile phone 22 is an apparatus which is suitable for providing notification according to the instruction from the television receiver 25, and functions as an apparatus which generates information.

Here, notification provided by a suitable apparatus will be described with reference to FIGS. 6 to 10.

In description performed with reference to FIG. 6 to FIG. 10, description will be continued based on an assumption in which an electronic mail addressed to a user A is received by one of the mobile phone 22, the personal computer 23, the tablet terminal 24, and the television receiver 25.

FIG. 6 illustrates a situation in which a user A is watching the television receiver 25 and the mobile phone 22 is placed in the vicinity of the user A. In such a situation, only the user A is present in front of the television receiver 25, the privacy of the user A being protected even when notification of reception of an electronic mail is provided using the television receiver 25.

In addition, the user A is watching the television receiver 25. Therefore, if the notification of reception of an electronic mail is provided using the television receiver 25, the user A immediately notices the notification.

In addition, in this case, the mobile phone 22 is in the vicinity of the user A but the screen of the mobile phone 22 is small. Even if notification is provided using the mobile phone 22 in a state in which the user A is watching the television receiver 25, there is a possibility that the user A does not notice the notification.

That is, in the situation shown in FIG. 6, there is a strong possibility that the user A notices the notification when notification is provided using the television receiver 25 rather than when notification is provided using the mobile phone 22, and it is possible to protect privacy even though notification is provided using the television receiver 25. In such a situation, it is determined that the television receiver 25 is an apparatus which is suitable for providing notification, and thus notification is provided using the television receiver 25.

In addition, it is possible to determine that privacy is protected, and information relevant to privacy is displayed as the content of notification. In an example shown in FIG. 6, information relevant to privacy such as "subject: about meeting tomorrow" and "sender: sender A" are displayed on the television receiver 25, together with a massage "mail is received".

In contrast, a case in which notification is provided using the mobile phone 22 as shown in FIG. 7 is conceivable in the same situation as the situation shown in FIG. 6. In such a situation, the user A is watching the television receiver 25, and thus there is a possibility that the user A does not notice notification using the mobile phone 22.

Accordingly, it is conceivable that it is possible to provide more appropriate notification when notification is provided using the television receiver 25 rather than when notification is provided using the mobile phone 22, as described with reference to FIG. 6. In addition, if the personal computer 23 or the tablet terminal 24 is not placed in the vicinity of the user A and notification is provided using the personal computer 23 or the tablet terminal 24, there is a small possibility that the user A notices the notification.

For example, when an electronic mail is received in advance and setting is made such that notification is provided using the tablet terminal 24, notification is provided by an apparatus, in which there is a small possibility that the user notices the notification, and thus there is a strong possibility that a problem occurs in that the user A does not notice the reception of the electronic mail as a result.

However, according to the present disclosure, notification is not provided to a preset apparatus, an apparatus for which there is the strongest possibility that the user A notices the notification is found at a point in time in which an event is generated, and then notification is provided. Therefore, it is possible to reduce a possibility that the above-described problem occurs.

Figure 8:
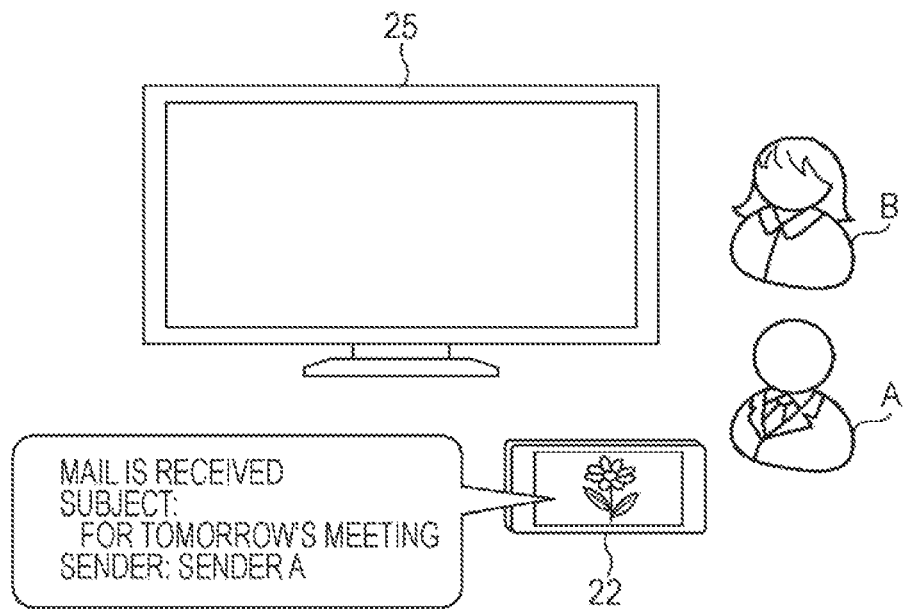
FIG. 8 is a diagram illustrating selection of an apparatus which is suitable for providing notification.

Subsequently, another situation will be described. A situation shown in FIG. 8 is similar to the situation shown in FIG. 6 but is different from the situation shown in FIG. 6 in that the user A and a user B are watching the television receiver 25. At the time of such a situation, when notification of the reception of an electronic mail is provided using the television receiver 25, the user A and the user B see the notification.

In such a case, there is a possibility that privacy of the user A is not protected. Accordingly, it is conceivable that notification provided using the television receiver 25 is not preferable. Here, since the mobile phone 22 is placed in the vicinity of the user A, notification is provided using the mobile phone 22.

That is, in a case of the situation shown in FIG. 8, when notification is provided using the television receiver 25, there is a possibility that it is difficult to protect privacy, and thus it is determined that notification is not provided using the television receiver 25. Further, it is determined that notification is provided using the mobile phone 22 which is placed in the vicinity of the user A. The mobile phone 22 is used by the user A and has a relatively small screen. Therefore, if information relevant to privacy is displayed, it is determined that there is a strong possibility that privacy is maintained.

As a result of the determination, notification, which includes information relevant to privacy, such as "subject" or "sender", is provided using the mobile phone 22 as shown in FIG. 8.

Subsequently, another situation will be described with reference to FIG. 9. The situation shown in FIG. 9 is a situation in which, when the user A and the user B are watching the television receiver 25, an electronic mail addressed to a user A is received using any one of the mobile phone 22, the personal computer 23, the tablet terminal 24, and the television receiver 25, similarly to the situation shown in FIG. 8.

Figure 9:
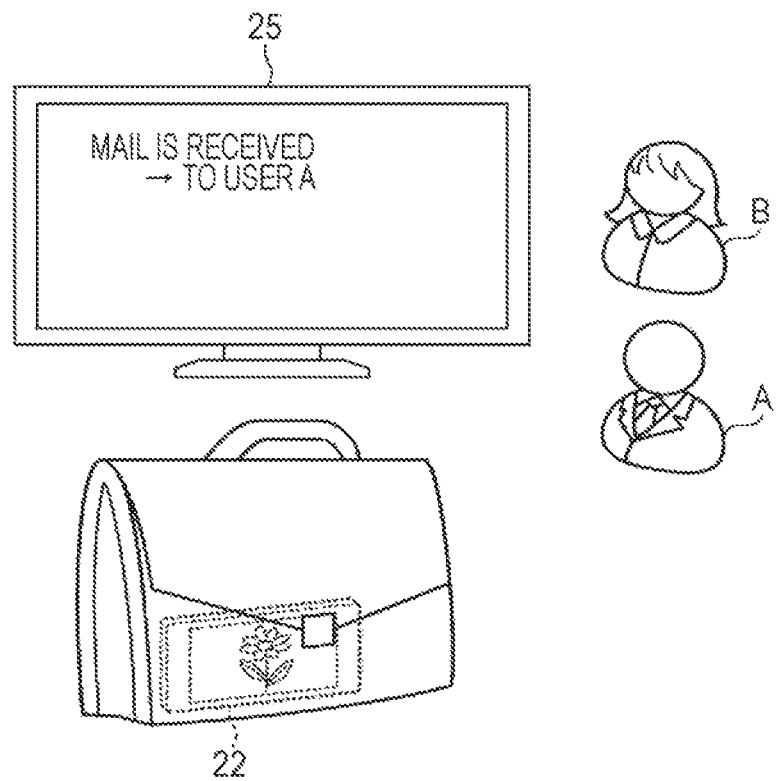
FIG. 9 is a diagram illustrating selection of an apparatus which is suitable for providing notification.

However, in the situation shown in FIG. 9, the mobile phone 22 is placed in, for example, a bag, and thus it is difficult for the user A to notice notification even though the mobile phone 22 is in the vicinity of the user A. In such a situation, if notification is provided using the mobile phone 22, there is a strong possibility that the user A does not notice the notification, as described with reference to FIG. 8.

Accordingly, as shown in FIG. 9, notification is provided using the television receiver 25. However, since the user A and the user B are watching the television receiver 25, there is a possibility that privacy is not maintained. Here, as shown in FIG. 9, notification is provided while information relevant to privacy is not displayed. In the example shown in FIG. 9, a message "mail is received->addressed to user A" is displayed but information of a subject or a sender is not displayed.

As above, an apparatus which provides notification is selected such that notification is not provided using an apparatus in which there is a small possibility that the user notices the notification as much as possible.

Figure 10:
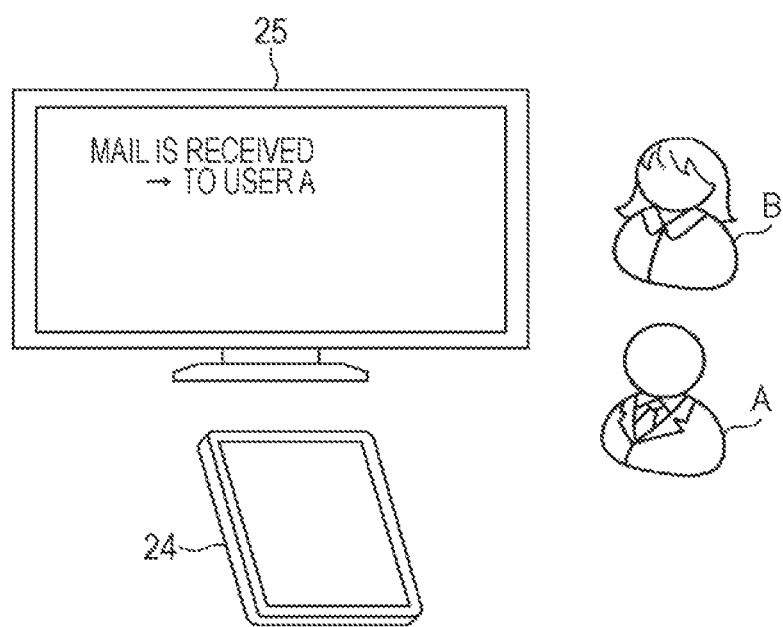
FIG. 10 is a diagram illustrating selection of an apparatus which is suitable for providing notification.

Such a notification, in which the information relevant to privacy is not displayed, is provided in a situation as shown in FIG. 10. Similarly to FIGS. 8 and 9, the situation shown in FIG. 10 is that an electronic mail addressed to the user A is received using any one of the mobile phone 22, the personal computer 23, the tablet terminal 24, and the television receiver 25 when the user A and the user B are watching the television receiver 25.

In the situation shown in FIG. 10, the tablet terminal 24 is placed in the vicinity of the user A. The tablet terminal 24 is an apparatus which has a large screen compared to the mobile phone 22 and at which it is easy for another user in the vicinity of the user A to peek.

In such a situation, there is a possibility that privacy is not maintained when display is performed on either the tablet terminal 24 or the television receiver 25. Accordingly, notification in which the information relevant to privacy is not displayed is provided.

When the tablet terminal 24 is compared with the television receiver 25 and the state, in which the television receiver 25 is being watched and the television receiver 25 normally has a larger screen than the tablet terminal 24, is considered, it is determined that notification is more certainly provided to the user A when the notification is provided using the television receiver 25.

Here, as shown in FIG. 10, notification, in which the privacy information is not displayed, is provided using the television receiver 25.

As above, according to the present disclosure, when a prescribed event is generated, an apparatus which provides notification of the generation is appropriately selected, and then the notification is provided. Therefore, it is possible to reduce a possibility that failure of recognition of event generation by the user occurs. In addition, it is possible to provide notification in which privacy is protected.

Operation of System According to First Embodiment

The operation of the system shown in FIG. 1 will be described with reference to a flowchart shown in FIG. 11. In description with reference to the flowchart shown in FIG. 11, a case in which the mobile phone 22 detects event generation and the television receiver 25 provides notification of the event generation will be described as an example.

The mobile phone 22 detects event generation in step S21. For example, reception of an electronic mail is detected as an event. When the mobile phone 22 detects the event generation, the mobile phone 22 issues a response request to an apparatus connected to the network 10 in step S22.

The range of the apparatus to which the response request is issued includes an apparatus which is determined to be present on the same LAN as the apparatus which detects the event, an apparatus which has a record of paring (linking) in the past and which is capable of performing communication through the network 10, or the like.

Figure 11:
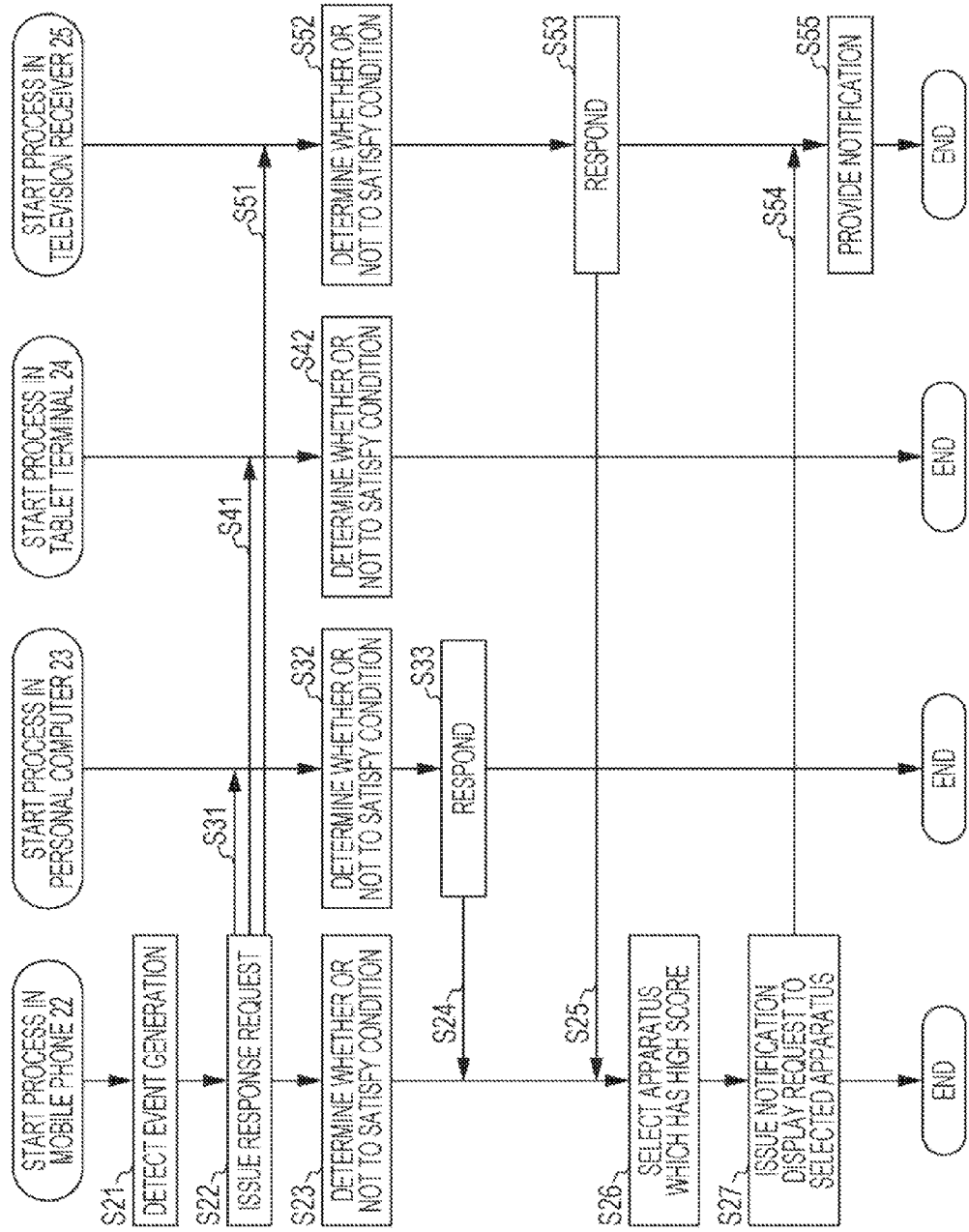
FIG. 11 is a diagram illustrating an operation performed by a system according to a first embodiment.

In an example shown in FIG. 11, a response request is issued from the mobile phone 22 to the personal computer 23, the tablet terminal 24, and the television receiver 25. Although description will be made in detail later with reference to a flowchart shown in FIG. 12, the response request issued from the mobile phone 22 includes information relevant to a notification destination user, information relevant to a prescribed condition (priority), and an instruction to cause an apparatus which satisfies the condition to respond.

Such a response request is issued to the apparatus which issued the response request, that is, the mobile phone 22 in this case. The reason for this is to determine whether or not the mobile phone 22 is appropriate as an apparatus which provides notification.

The mobile phone 22 receives the response request which is issued by itself, and determines whether or not the mobile phone 22 satisfies a condition included in the response request in step S23.

The personal computer 23 receives the response request from the mobile phone 22 in step S31, and determines whether or not the personal computer 23 satisfies the condition included in the response request in step S32.

The tablet terminal 24 receives the response request from the mobile phone 22 in step S41, and determines whether or not the tablet terminal 24 satisfies the condition included in the response request in step S42.

The television receiver 25 receives the response request from the mobile phone 22 in step S51, and determines whether or not the television receiver 25 satisfies the condition included in the response request in step S52.

As above, each of the apparatuses, which receive the response request, determines whether or not the apparatus satisfies the condition included in the response request. Further, the apparatus, which is determined to satisfy the condition, responds. Here, it is assumed that the apparatus, which is determined to satisfy the condition, includes the personal computer 23 and the television receiver 25. The details of the determination of whether or not the apparatus satisfies the condition will be described later with reference to a flowchart in FIG. 13.

The personal computer 23 receives a result of determination of satisfying the condition in step S33, and responds to the mobile phone 22. The response includes a score indicative of a degree of satisfying the condition. The score will be described later. Here, description is continued based on an assumption in which the score is high when there is a strong possibility of satisfying the condition.

Similarly, the television receiver 25 receives a result of determination of satisfying the condition in step S53, and responds to the mobile phone 22. The tablet terminal 24 receives a result of determination that the condition is not satisfied, and does not respond to the mobile phone 22.

The mobile phone 22 receives a response from the personal computer 23 in step S24, and receives a response from the television receiver 25 in step S25. The mobile phone 22 acquires a result of determination performed by itself.

The mobile phone 22 sorts received scores in descending order in step S26 and selects an apparatus which has a high score. The selected apparatus is an apparatus, which is determined to be suitable for providing notification at that point in time, as described with reference to FIGS. 6 to 10.

Here, the score of the mobile phone 22, the score of the personal computer 23, and the score of the television receiver 25 are acquired, and description is continued while it is assumed that the score of the television receiver 25 is the highest. In such a case, in step S26, the television receiver 25 is selected as an apparatus which provides notification to the user.

In step S27, the mobile phone 22 issues a notification display request to the selected apparatus. The notification display request includes notification content, for example, a message to provide notification that a mail is received, or information of a subject provided when information relevant to privacy is displayed.

The television receiver 25 receives the notification display request from the mobile phone 22 in step S54. Further, the television receiver 25 provides notification to the user based on information which is included in the notification display request from the mobile phone 22 in step S55. Meanwhile, the notification includes notification which is provided by issuing a prescribed sound in addition to the display of a message on the screen as described above.

Meanwhile, in the example shown in FIG. 11, description is made such that the mobile phone 22, the personal computer 23, and the television receiver 25 satisfy the condition, scores are calculated, and responses are provided to the mobile phone 22. However, when there is no apparatus which responds, in other words, there is no apparatus which satisfies the condition, the mobile phone 22 which detects the event changes the condition, and issues the response request to the mobile phone 22, the personal computer 23, the tablet terminal 24, and the television receiver 25 again.

The mobile phone 22 changes the condition and issues the response request until a response is received. Such a process will be described with reference to a flowchart in FIG. 12.

Operation of Terminal According to First Embodiment

Figure 12:
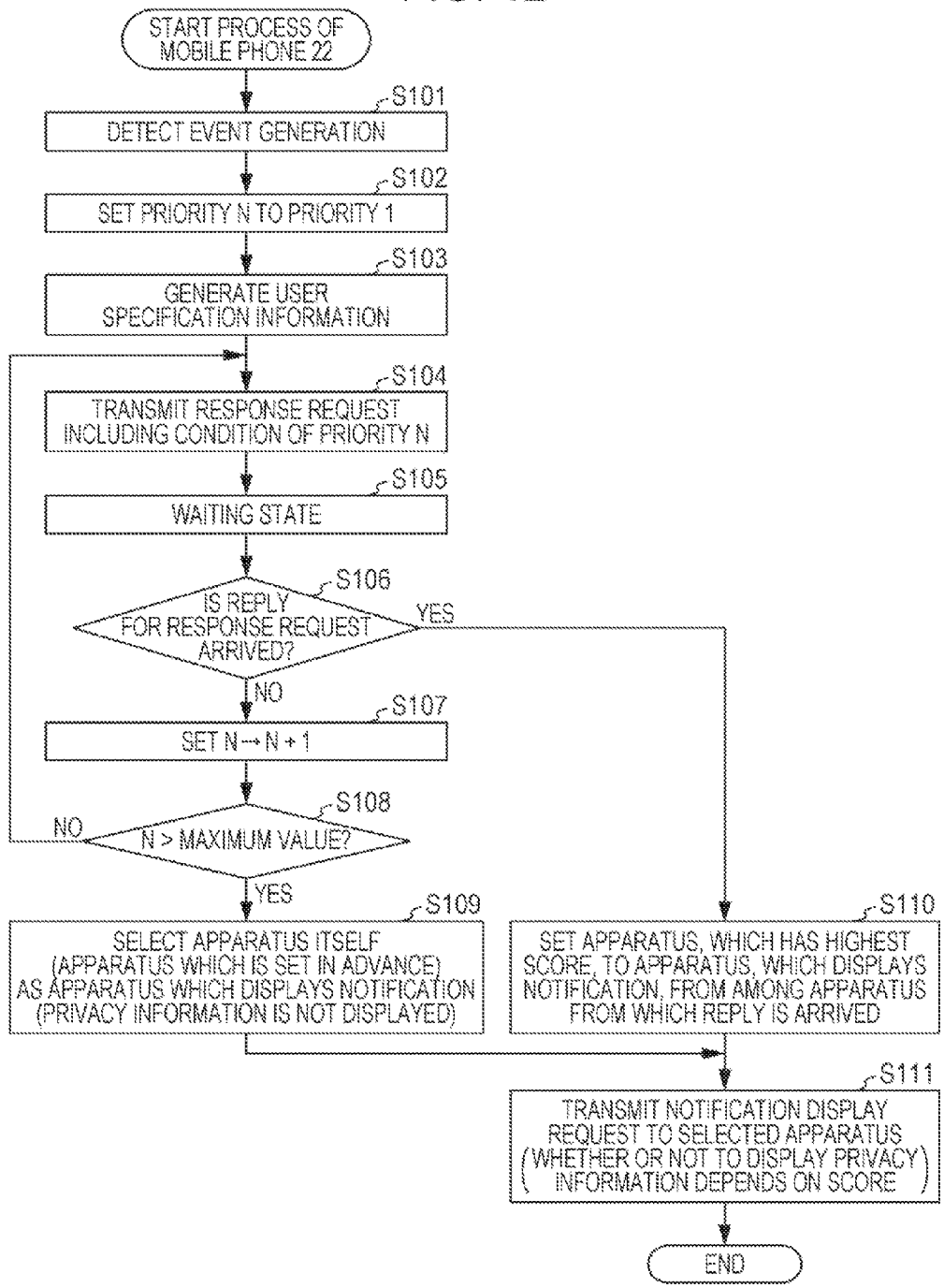
FIG. 12 is a flowchart illustrating an operation performed by a terminal according to the first embodiment.

FIG. 12 is a flowchart illustrating a process performed by a terminal which detects an event. Here, description will be continued while it is assumed that the terminal which detects an event is the mobile phone 22.

In step S101, the mobile phone 22 detects an event, for example, reception of an electronic mail, a reserved starting time, or the like.

In step S102, priority N is set to 1 by the priority setting unit 201 (FIG. 5). Here, the priority will be described. The priority is a condition which is included in the response request and is a condition in which a response is provided when the condition is satisfied. Here, description will be made while it is assumed that the priority is set to 1 to 5.

(Priority 1) It is possible to display privacy information and there is a strong possibility that a user immediately notices (Priority 2) It is possible to display privacy information and there is a problem that it is slightly difficult for a user to notice (Priority 3) It is difficult to display privacy information and there is a strong possibility that a user immediately notices (Priority 4) It is difficult to display privacy information and there is a problem that it is slightly difficult for a user to notice (Priority 5) It is possible to display privacy information and there is a problem in that it is difficult for a user to notice The priorities 1 to 5 are set as above. The conditions of the priorities 1 to 5 are examples and the present disclosure is not limited thereto. In addition, the order of the priorities is not limited to this order. For example, a fact that it is possible to display privacy information may be set to a high priority, and setting may be made such that the above-described priority 5 is set to the priority 3.

In addition, setting may be made such that the priority is fixed or is changed according to certain conditions. In addition, setting may be made such that the priority is set by the user.

Here, description will be continued based on an assumption in which the priorities 1 to 5 are set as in the above-described example and the priorities are sequentially included in the response request from the priority 1 and transmitted. As above, the conditions, which are set for the priorities, are conditions which each include a first condition relevant to display of privacy information and a second condition related to whether or not the user notices notification. In addition, a plurality of priorities are set by combining the first condition and the second condition, and the priorities are allocated based on preferable conditions.

In step S102, when a priority N is set to the priority 1, the process proceeds to step S103. In step S103, user specification information is generated by the user specification information generation unit 202 (FIG. 5). The user specification information which is generated in step S103 is information for specifying a user who is a target to which notification is provided.

For example, when an electronic mail is received, an electronic mail address of the destination of the electronic mail is the user specification information. In addition, when it is possible to acquire the facial feature quantity which is used for face recognition, the feature quantity may be the user specification information. In addition, a user ID or the like, which is used when logging into a specified site, may be the user specification information. Such information is extracted from information of the detected event according to the detected event or is acquired from the cloud service provision apparatus 21 (FIG. 1) as necessary.

In step S104, the response request generation unit 203 (FIG. 5) prepares a response request using the condition of the priority N. The user specification information is also included in the prepared response request. The prepared response request is transmitted to each of the apparatuses by the transmission/reception control unit 206. In this case, the response request is transmitted to the personal computer 23, the tablet terminal 24, and television receiver 25.

In step S105, the mobile phone 22 is in a waiting state as long as prescribed time. The waiting state is the time when waiting for a response from the apparatus which transmits the response request.

When a prescribed time elapses and the waiting state is released, it is determined whether or not a reply for the response request has arrived in step S106.

When it is determined that a response to the response request has not arrived in step S106, the process proceeds to step S107. In step S107, the priority N is changed to a priority which is increased by 1. As above, when there is no response from each of the apparatuses, the priority setting unit 201 sequentially sets the priority to an increased priority.

In step S108, it is determined whether or not N is greater than a maximum value. Here, since the priority N is set up to the priority 5, it is determined whether or not N is set to a value which is greater than 5.

When it is determined that N is not greater than the maximum value in step S108, the process returns to step S104, and subsequent processes are repeated.

In contrast, if it is determined that N is greater than the maximum value in step S108, the process proceeds to step S109. In step S109, the apparatus which detects the event or an apparatus which is set in advance is selected as an apparatus which provides notification to the user. In addition, the notification is set to notification which does not display privacy information.

When the process proceeds to step S109, there is a strong possibility that the user notices the event generation, and an apparatus which can provide notification in a state in which privacy is protected is not found. In such a case, notification of the event is provided by the apparatus which detects the event or notification is provided by, for example, an apparatus which is preset by the user.

When the apparatus which provides notification is set in step S109, the process proceeds to step S111. In step S111, a display request is generated by the display request generation unit 205 (FIG. 5). In this case, since the process proceeds from step S109 to step S111, the privacy information is not included as information included in the display request.

In contrast, when it is determined that a response is provided for the response request in step S106, the process proceeds to step S110. In step S110, the score deciding unit 204 (FIG. 5) detects an apparatus which has a high score from among apparatuses from which a reply has arrived, and sets the apparatus to the apparatus which provides notification. When the apparatus which provides notification is set, the process proceeds to step S111.

In step S111, the display request is generated by the display request generation unit 205. In this case, the process proceeds from step S110 to step S111, information, which is included in the display request, is information which includes or does not include the privacy information according to the priority which is set at the point in time in which the response is provided.

That is, for example, when the priority 1, in which the condition "it is possible to display privacy information and there is a strong possibility that the user immediately notice" is set, is set and a response has arrived, display request information which includes privacy information is generated, and the display request is issued to an apparatus which has the highest score.

An apparatus, which detects the event generation as above, performs a process of selecting an apparatus which is suitable for providing notification of the event generation to the user.

Meanwhile, in the flowchart shown in FIG. 12, the process of selecting an apparatus which is suitable for providing notification of the event generation to the user has been described. The apparatus, which detects the event generation, performs the process of determining whether or not the apparatus satisfies conditions which are set in the priority N, and to calculate the score. Accordingly, the process of calculating the score is included as the process of the mobile phone 22 shown in FIG. 12, and is performed, for example, in the waiting state in step S105.

The calculation of the score will be described with reference to FIG. 13. Here, since the mobile phone 22, which detects the event generation, performs the process of calculating the score, in other words, since the mobile phone 22 is a selection target as an apparatus which provides notification to the user, description will be continued based on a process performed by the mobile phone 22.

In Step S131, the mobile phone 22 is in a state of waiting for the arrival of a response request from the apparatus which detects the event generation. Further, if the response request from the apparatus which detects the event generation is received, the process proceeds to step S132.

In step S132, matching with the notification destination user is performed by the matching processing unit 207 (FIG. 5). For example, the response request includes information such as an electronic mail address or a facial feature quantity. The electronic mail address corresponds to a user ID and it is preferable that the user ID and the facial feature quantity be included in the response request.

In addition to the electronic mail address, a user ID, for logging into a prescribed site, may be used as the user ID. As described above, when the user ID is acquired, the side of the apparatus which detects the event generation accesses the cloud service provision apparatus 21, acquires the user ID, and receives the user ID as the response request information if necessary.

The matching processing unit 207 (FIG. 5) refers to the user ID and the facial feature quantity which are included in the response request, and determines one of the corresponding conditions of matching numbers shown below. A lower matching number has a higher score value.

(Matching number 1) A user ID matches and a facial feature quantity matches (Matching number 2) Only a user ID matches and it is unclear whether or not a facial feature quantity matches (Matching number 3) Only a facial feature quantity matches and it is unclear whether or not a user ID matches Meanwhile, the conditions which are set for the matching numbers shown here and the order of the matching numbers are examples and are not limited thereto. For example, the condition of the matching number 2 may be replaced with the condition of the matching number 3.

When the user ID matches, there is a strong possibility that the apparatus is being operated. For example, in a case of a state in which a user logs into a prescribed site using the personal computer 23 with a prescribed user ID, there is a strong possibility that the user is operating the personal computer 23.

Each terminal has a function of imaging the face of the user in order to determine whether or not the face of the user matches the facial feature quantity. For example, the mobile phone 22 includes the imaging unit 51 (FIG. 2), images the face of the user using the imaging unit 51, and calculates the facial feature quantity using the face recognition unit 52 (FIG. 2).

As above, when the face of the user which is in the vicinity of the mobile phone 22 is imaged and the feature quantity can be calculated, matching with the facial feature quantity which is included in the response request is performed.

However, for example, in a case of the television receiver 25 which has the configuration as shown in FIG. 4, it is possible to determine whether or not a person is present in front of the television receiver 25 using information from the sensor unit 151. However, it is difficult to image the face of the person and calculate the feature quantity using only the sensor function. In such a case, matching with the facial feature quantity included in the response request is not performed.

In step S132, matching is performed in order to determine whether or not one of the conditions, which are set for the matching numbers 1 to 3, matches, the result of the matching is used, and determination in step S133 is performed.

In step S133, it is determined whether or not the notification destination user matches. In step S133, it is determined whether or not the notification destination user matches by determining whether or not any one of the conditions, which are set as the matching numbers 1 to 3, is satisfied. The determination is determination of whether or not the notification target user is present in the vicinity of the apparatus.

Figure 13:
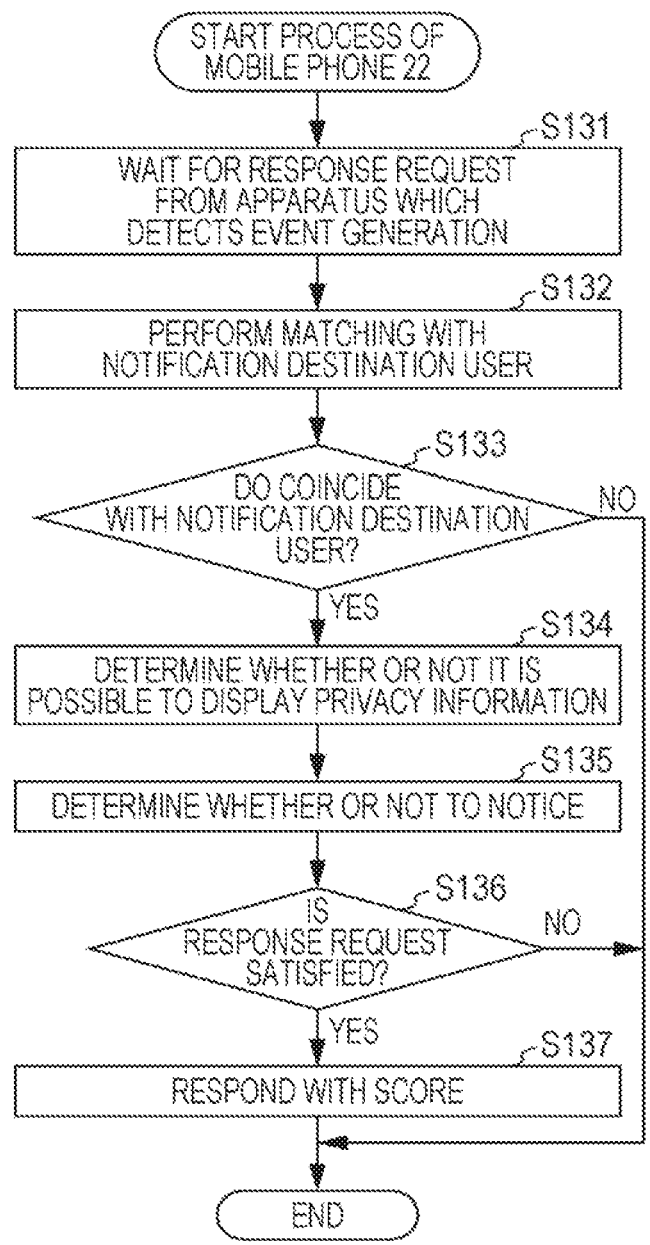
FIG. 13 is a flowchart illustrating an operation performed by the terminal according to the first embodiment.

When it is determined not to the notification destination user matches in step S133, in other words, when none of the conditions which are set as the matching numbers 1 to 3 is satisfied, a response is not provided for the response request, and thus the process of the flowchart shown in FIG. 13 ends.

In contrast, when it is determined that the notification destination user matches in step S133, in other words, when it is determined that any one of the conditions, which are set as the matching numbers 1 to 3, is satisfied, the process proceeds to step S134.

In step S134, the privacy determination unit 208 (FIG. 5) determines whether or not it is possible to display privacy information. The privacy determination unit 208 determines the corresponding conditions of displayable numbers below. A lower displayable number has a higher score value.

(Displayable number 1) Only the face of a user is detected and only the voice of the user is detected.

(Displayable number 2) Only the face of a user is detected and it is not clear whether or not the voice of a person other than the user is detected (Displayable number 3) Apparatus which is used to log into with a user ID (a result of face detection is not clear and a result of voice detection is ignored)

As described with reference to FIGS. 6 to 10, the privacy information is displayed in a situation when only the notification target user recognizes the display and is not displayed in a situation when notification is viewed by a user other than the notification target user.

The condition which is set for displayable number 1 is "only the face of a user is detected and only the voice of the user is detected". In a situation in which such a condition is satisfied, there is a strong possibility that no one is present other than the user in that place.

The condition which is set for displayable number 2 is "only the face of a user is detected and it is not clear whether or not the voice of a person other than the user is detected". In such a situation, there is a possibility that no one other than the user is present within an imaged image but another user may be present in a range which is not imaged. Meanwhile, "it is not clear whether or not the voice of a person other than the user is detected" of the condition includes a case in which it is not determined whether or not the voice is the voice of a person other than the user, and a case in which the apparatus does not have a function of collecting a voice and it is difficult to recognize a user based on the voice.

The condition which is set for displayable number 3 is, "apparatus which is used to log into with a user ID". In a case of, for example, an apparatus which does not have an imaging function or a voice collecting function, in which it is difficult to recognize the user by imaging the face of the user, and in which it is difficult to recognize the user by collecting a voice, it is possible to recognize a user by determining whether or not the user has logged into with the user ID in the apparatus. Here, when it is determined to be an apparatus, which is used to log into with the user ID, as a result of such user recognition, it is determined to correspond to displayable number 3.

In step S134, it is determined whether or not a condition set for any one of displayable numbers 1 to 3 is satisfied. When it is determined to be satisfied, a score corresponding to the number determined to be satisfied is given.

In step S135, the reliability determination unit 209 (FIG. 5) determines whether or not the user certainly notices notification. The reliability determination unit 209 determines conditions corresponding to reliability numbers shown below. A lower reliability number has a higher score value.

User Certainly Notices (Reliability number 1-1) User is currently watching according to a camera image (continuously)

(Reliability number 1-2) User is currently watching according to a camera image (only recently)

(Reliability number 1-3) User is currently performing an operation (Reliability number 1-4) User often immediately notices based on determination of a past history (in a case of a user interface on which the user performs some kinds of application after notification is displayed)

Problem in that it is slightly difficult for user to notice (Reliability number 2-1) User has recently performed an operation (Reliability number 2-2) User often notices a little late according to determination based on past history (in a case of a user interface on which the user performs some kinds of application after notification is displayed)

Problem in that user does not notice (Reliability number 3-1) Not applicable above Here, an example in which three major classifications are performed is shown. The reason that three classifications are performed is that the conditions, which are set for above-described priorities 1 to 5, include "the user immediately notices", "there is a problem that it is slightly difficult to notice", and "there is a problem of not noticing". Here, description will be continued based on an example in which three classifications are performed in order to enable the classification to be performed when it is determined whether or not a priority included in the response request is satisfied.

The condition which is set for reliability number 1-1 is "the user is currently watching according to a camera image (continuously)". For example, in an apparatus which has an imaging function, if the user is imaged when the response request is received and it is possible to recognize that the user is in front of the apparatus, there is a strong possibility that the user certainly notices notification if the notification is provided using the apparatus.

The condition which is set for reliability number 1-2 is "the user is currently watching according to a camera image (only recently)". For example, if it is recognized that the user is in front of the apparatus based on the camera image before a point in time at which the response request is received, there is a strong possibility that the user is still in front of the apparatus at a point in time at which the response request is received, and thus there is a strong possibility that the user certainly notices notification if the notification is provided using the apparatus.

The condition which is set for reliability number 1-3 is "the user is currently performing an operation". When it is difficult to recognize whether or not the user is in front of the apparatus by imaging the face of the user but it is possible to recognize the operation of an operation unit, such as a keyboard, in a state in which, for example, the user is logged into to a prescribed site using the user ID, there is a strong possibility that the user is in front of the apparatus, and thus there is a strong possibility that the user certainly notices notification if the notification is provided using the apparatus.

The condition which is set for reliability number 1-4 is "the user often immediately notices based on determination of a past history (in a case of a user interface on which the user performs some kinds of application after notification is displayed)". For example, when notification of reception of an electronic mail is provided, a history in which electronic mails are open is acquired, and thus it is determined to correspond to the condition which is set for reliability number 1-4 when it is determined that the user often immediately notices the notification based on the history.

The condition which is set for reliability number 2-1 is "the user has recently performed an operation". Although the condition is similar to the condition which is set for reliability number 1-3, there is difference in that the condition which is set for reliability number 1-3 corresponds to a case in which it is determined that the operation is "currently" performed, and the condition which is set for reliability number 2-1 corresponds to a case in which it is determined that the operation has "recently" been performed. The term "recently" indicates the time before a prescribed time from when the response request is received like, for example, within 15 minutes.

The condition which is set for reliability number 2-2 is "the user often notices a little late according to determination based on past history (case of a user interface which causes a user to perform some kinds of application after displaying notification)". Although the condition is similar to the condition which is set for reliability number 1-4, there is difference in that the condition which is set for reliability number 1-4 is a case in which it is determined that "there is a strong possibility that the user immediately notices" and the condition which is set for reliability number 2-2 is a case in which it is determined that "the user often notices a little late".

For example, when it is determined that there is little history in which the user notices within five minutes after notification is provided but there is a lot of history in which the user notices within one hour, it is determined to correspond to the condition which is set for reliability number 2-2.

The condition which is set for reliability number 3-1 is determined to correspond to a case in which none of the conditions of reliability numbers 1-1 to 1-4 and reliability numbers 2-1 and 2-2 is satisfied.

In step S135, it is determined whether or not any one of the conditions which are set for the reliability numbers is satisfied, and a score is given to the number which is determined to be satisfied.

In step S136, the condition determination unit 210 (FIG. 5) determines whether or not the condition of the response request is satisfied. As described above, the response request includes any one of priorities 1 to 5. For example, when the response request includes the condition of priority 1, it is determined whether or not the condition which is set for priority 1 is satisfied.

For example, the condition of priority 1 is "it is possible to display privacy information and the user immediately notices". Here, the result of determination performed in step S134 is used to determine whether or not the condition "it is possible to display privacy information" is satisfied. That is, when it is determined that none of the conditions of displayable numbers 1 to 3 is satisfied in step S134, it is determined that the condition "it is possible to display privacy information" is not satisfied.

In addition, when it is determined that any one of the conditions of displayable numbers 1 to 3 is satisfied in step S134, it is determined that the condition "it is possible to display privacy information" is satisfied, and it is further determined whether or not the condition "the user immediately notices" is satisfied.

The result of determination performed in step S135 is used to determine whether or not the condition "user immediately notices" is satisfied. That is, when it is determined that none of the conditions of reliability numbers 1-1 to 1-3 is satisfied in step S135, it is determined that the condition "the user immediately notices" is not satisfied.

In addition, when it is determined that any one of the conditions of reliability numbers 1-1 to 1-3 is satisfied in step S135, it is determined that the condition of the response request is satisfied in step S136, and the process proceeds to step S137.

In step S137, a response is provided to the apparatus, which transmits the response request, together with the score. For example, when it is determined that the condition of priority 1 is satisfied, a reply, in which any one of the conditions of displayable numbers 1 to 3 is satisfied, a score given to the number is included, any one of the conditions of reliability numbers 1-1 to 1-3 is satisfied and a score given to the number is included, is generated and transmitted, and then the process ends.

In contrast, when it is determined that the condition of the response request is not satisfied in step S136, the process ends without sending the reply.

As above, the side of the apparatus which receives the response request determines whether or not the condition included in the response request is satisfied. When the condition included in the response request is satisfied, a response is provided together with a score indicative of a degree of satisfying the condition.

As described with reference to FIG. 12, the side of the apparatus, which detects the event generation, selects an apparatus which has a high score from among apparatuses which provide a response in step S110. The score, which is referred to when the selection is performed, is a score which is calculated in the process which is described with reference to FIG. 13.

Meanwhile, as described above, there is no apparatus which responds to the response request from among apparatuses on the side which detects the event generation, the response request is issued again after changing the priority. Therefore, the side, which receives the response request, determines again whether or not the condition of the priority, which is included in the response request, is satisfied. In such a case, the process described with reference to the flowchart of FIG. 13 is performed again.

The side, which receives the response request, maintains a result of determination until, for example, a prescribed time elapse. When the response request (response request which has a different priority) is received again, the process in step S136, that is, determination of whether or not the condition of the response request is satisfied may be performed using the maintained result of determination.

Operation of System According to Second Embodiment

Further, in the above-described embodiment, it is determined whether or not an apparatus on the side, in which an event is detected, satisfies the set condition of priority. When the condition is satisfied, a reply is sent. However, a reply of the condition of a priority satisfied by the apparatus and a score which satisfies the condition may be sent. Such a form will be further described.

Figure 14:
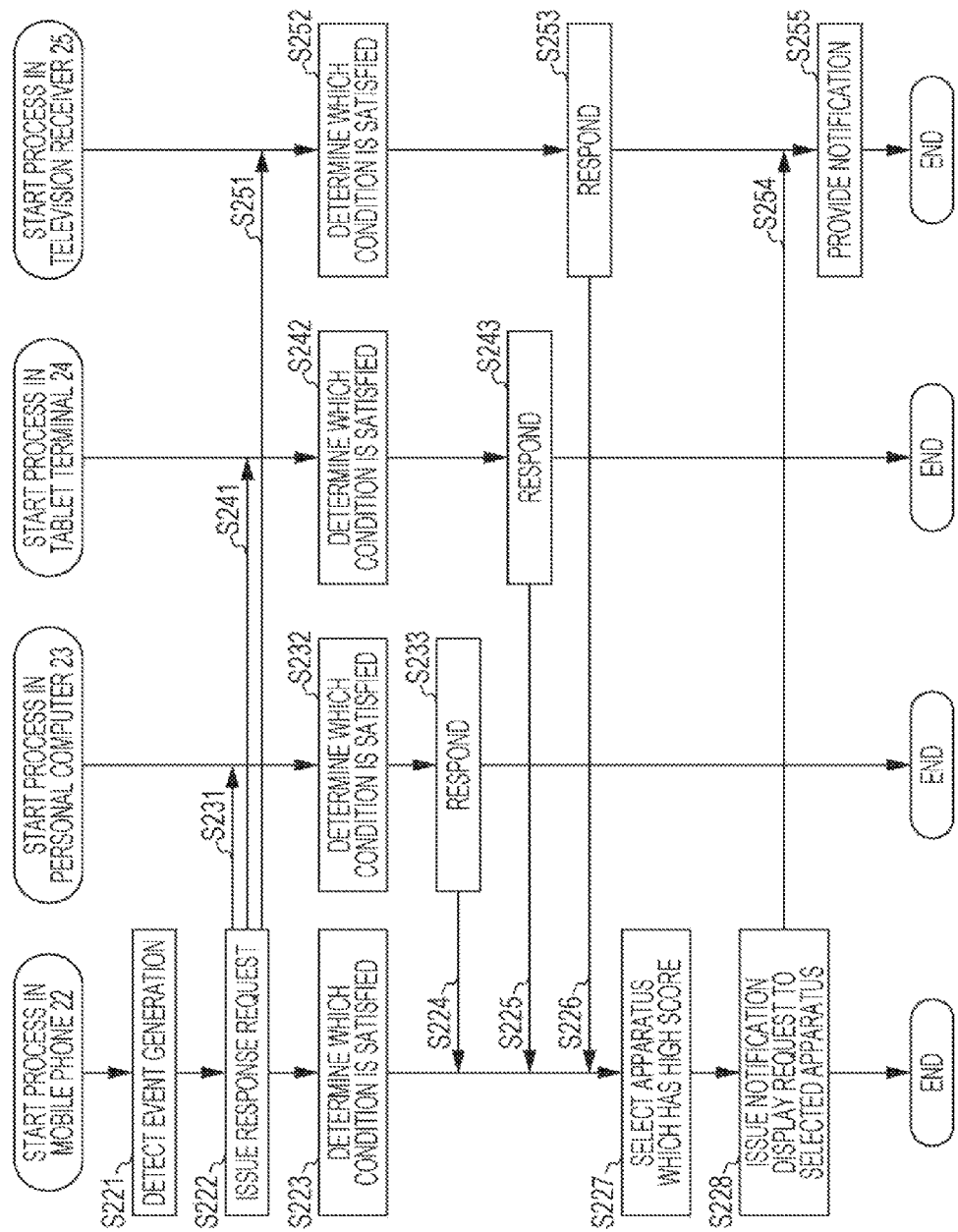
FIG. 14 is a diagram illustrating an operation performed by a system according to a second embodiment.

FIG. 14 is a flowchart illustrating a process which is performed in the system shown in FIG. 1 according to the second embodiment. Description, which will be described with reference to FIGS. 14 to 16, will be described using a process, performed under the same situation as the situation described with reference to FIGS. 11 to 13, as an example.

That is, the description with reference to the flowchart shown in FIG. 14 is made based on a case, in which the mobile phone 22 detects event generation and notification of the event generation is provided using the television receiver 25, as an example. In addition, since the same process as the process described with reference to FIG. 11 is included, the description of the same process is not repeated appropriately.

The mobile phone 22 detects event generation in step S221. For example, the mobile phone 22 detects the reception of an electronic mail as an event. When the mobile phone 22 detects the event generation, the mobile phone 22 issues a response request to an apparatus, which is connected to the network 10, in step S222.

In the example shown in FIG. 14, the response request is issued from the mobile phone 22 to the personal computer 23, the tablet terminal 24, and the television receiver 25. Although details will be described later with reference to a flowchart of FIG. 15, the response request, which is issued from the mobile phone 22, is included in information about a notification destination user but is not related to information about priority.

Such a response request is also issued to the apparatus which issues the response request, that is, the mobile phone 22 in this case. The reason for this is to determine whether or not the mobile phone 22 is appropriate as an apparatus which provides notification.

The mobile phone 22 receives the response request which is issued by itself, and determines a condition which is satisfied in S223. Although description will be made later with reference to FIG. 16, an apparatus which receives the response request determines a condition (condition corresponding to priority) which is satisfied by the apparatus, and sends a reply including the condition which is satisfied.

The personal computer 23 receives the response request from the mobile phone 22 in step S231, and determines a condition which is satisfied in step S232.

The tablet terminal 24 receives the response request from the mobile phone 22 in step S241, and determines a condition which is satisfied in step S242.

The television receiver 25 receives the response request from the mobile phone 22 in step S251, and determines a condition which is satisfied in step S252.

As above, the apparatus which received the response request determines a condition which is satisfied by the apparatus. Further, the apparatus generates information, which includes the satisfied condition, and responds.

The personal computer 23 responds to the mobile phone 22 in step S233. The tablet terminal 24 responds to the mobile phone 22 in step S243. The television receiver 25 responds to the mobile phone 22 in step S253.

The mobile phone 22 receives responses from the personal computer 23, the tablet terminal 24, and the television receiver 25, respectively, in steps S224 to S226. The mobile phone 22 acquires a result of determination performed by itself.

In step S227, the mobile phone 22 sorts scores indicative of degrees of satisfying the conditions which are included in the received replies in the order of high scores, and selects an apparatus which has a high score. The selected apparatus is an apparatus which is determined to be an apparatus suitable for providing notification at the time point as described with reference to FIGS. 6 to 10.

Here, description will be continued based on an assumption in which the score of the mobile phone 22, the score of the personal computer 23, the score of the tablet terminal 24, and the score of the television receiver 25 are respectively acquired, and the score of the television receiver 25 has the highest value. In such a case, the television receiver 25 is selected as an apparatus which provides notification to the user in step S227.

In step S228, the mobile phone 22 issues a notification display request to the selected apparatus. The notification display request includes notification content, for example, a message to provide notification of the reception of a mail, or information of a subject in a case in which information relevant to privacy is displayed.

The television receiver 25 receives the notification display request from the mobile phone 22 in step S254. Further, the television receiver 25 provides notification to the user based on information which is included in the notification display request from the mobile phone 22 in step S255.

Operation of Terminal According to Second Embodiment

Figure 15:
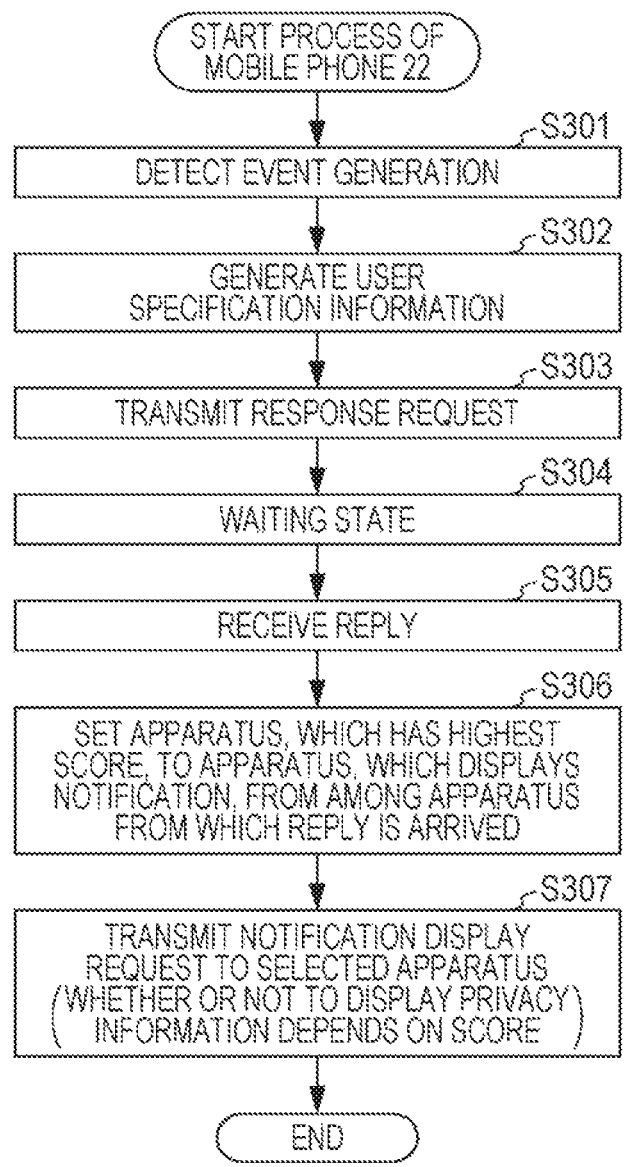
FIG. 15 is a flowchart illustrating an operation performed by a terminal according to the second embodiment.

FIG. 15 is a flowchart illustrating a process which is performed by a terminal which detects an event. Here, description will be continued based on an assumption in which the terminal which detects an event is the mobile phone 22.

In step S301, the mobile phone 22 detects an event, for example, reception of an electronic mail, a reserved starting time, or the like.

In step S302, user specification information is generated by the user specification information generation unit 202 (FIG. 5). The user specification information, which is generated in step S302, is information for specifying a user who is a target to which notification is provided. It is possible to perform the process in step S302 similarly to the process in step S103 of FIG. 12.

In step S303, the response request generation unit 203 (FIG. 5) prepares a response request which includes user specification information. The prepared response request is transmitted to each of the apparatuses by the transmission/reception control unit 206. In this case, the response request is transmitted to the personal computer 23, the tablet terminal 24, and the television receiver 25.

In step S304, the mobile phone 22 is in a waiting state for prescribed time. The waiting state is continued during time in which the apparatus which transmits the response request waits for a response. In the waiting state, a replay for the response request is received in step S305.

In step S306, the score deciding unit 204 detects an apparatus which has a high score from among the apparatuses from which replays are received, and sets the detected apparatus to an apparatus which provides notification. Meanwhile, an apparatus which satisfies a condition of high priority may be detected with reference to information indicative of a satisfied condition which is set to certain priority. When the apparatus which provides notification is set, the process proceeds to step S307.

In step S307, the display request is generated by the display request generation unit 205. In this case, the information which is included in the display request is information which includes privacy information or information which does not include the privacy information according to a score which is included in the reply from the set-up apparatus.

For example, if a score for a condition "displayable privacy information" is high, display request information which includes the privacy information is generated, and the display request is issued for the apparatus which has the score.

In this manner, the apparatus which detects the event generation performs a process of selecting an apparatus which is suitable for providing notification of the event generation to the user.

Calculation of score will be described with reference to FIG. 16. Here, since the mobile phone 22, which detects the event generation, performs the process of calculating the score, in other words, since the mobile phone 22 is a selection target as the apparatus which provides notification to the user, description will be continued based on an assumption in which the process is performed by the mobile phone 22.

Step S331 is a state of waiting for the response request from the apparatus which detects the event generation. Further, if the response request from the apparatus which detects the event generation is received, the process proceeds to step S332.

In step S332, matching with the notification destination user is performed by the matching processing unit 207 (FIG. 5). For example, the response request includes pieces of information such as an electronic mail address and facial feature quantity. The electronic mail address corresponds to a user ID, and the user ID and the facial feature quantity are included in the response request. It is possible to perform the process in step S332 similarly to the process in step S132 of the flowchart of FIG. 13.

As described above, a satisfied condition is determined from among the conditions which are respectively set for the matching numbers 1 to 3 in step S132. A satisfied condition is determined from among the conditions which are respectively set for the matching numbers 1 to 3 in step S332. Further, scores based on the determination are given.

Meanwhile, in the above-described process of the flowchart shown in FIG. 13, description is made such that, when it is determined that the notification destination user does not coincide in step S133, in other words, when anyone of the conditions which are set as the matching numbers 1 to 3 is not satisfied, the response request is not responded, and thus the process of the flowchart shown in FIG. 13 ends.

Figure 16:
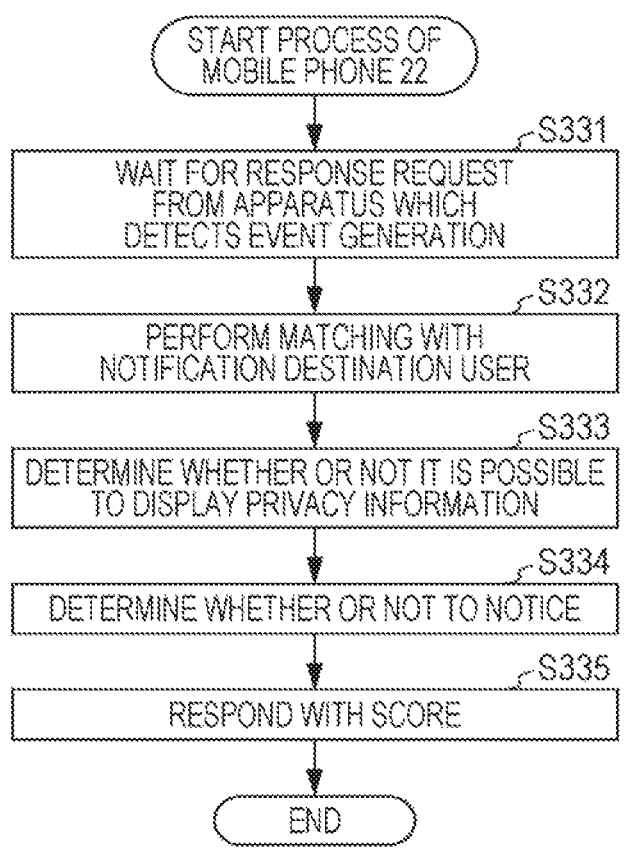
FIG. 16 is a flowchart illustrating an operation performed by the terminal according to the second embodiment.

Similarly, in step S332 of the process of the flowchart of FIG. 16, the notification destination user does not coincide. Therefore, when it is determined that none of the conditions which are set as the matching numbers 1 to 3 is satisfied, the process may end. Here, description will be continued, based on an assumption in which such an apparatus responds, as another example.

According to the second embodiment, there is a possibility that such an apparatus may have a higher score than other apparatus and the apparatus is selected as the apparatus which provides notification to the user.

In step S332, when it is determined that none of the conditions which are set as the matching numbers 1 to 3 is satisfied, the score of matching is 0.

In step S333, the privacy determination unit 208 (FIG. 5) determines whether or not it is possible to display the privacy information. The privacy determination unit 208 determines whether or not any one of the conditions which are set for the displayable numbers 1 to 3 is satisfied by performing the same process as the process in step S134 (FIG. 13).

In step S333, when it is determined whether or not a condition which is set for any one of the displayable numbers 1 to 3 is satisfied and it is determined that the condition is satisfied, a score corresponding to the number which is determined to be satisfied is given. Meanwhile, when it is determined that none of the conditions which are set for the displayable numbers 1 to 3 is satisfied, a score, which is relevant to whether or it is possible to display the privacy information, is set to 0.

In step S334, the reliability determination unit 209 determines whether or not the user certainly notices the notification. The reliability determination unit 209 determines whether or not any one of the conditions which are set for reliability numbers is satisfied by performing the same process as the process in step S135 (FIG. 13).

In above-described step S135, description has been made based on the assumption in which conditions shown below are set.

User Certainly Notices (Reliability number 1-1) User is currently watching according to a camera image (continuously)

(Reliability number 1-2) User is currently watching according to a camera image (only recently)

(Reliability number 1-3) User is currently performing an operation (Reliability number 1-4) User often immediately notices based on determination of a past history (in a case of a user interface on which the user performs some kinds of application after notification is displayed)

Problem in that it is slightly difficult for user to notice (Reliability number 2-1) The user has recently performed an operation (Reliability number 2-2) User often notices a little late based on determination of a past history (case of user interface which causes user to perform some kinds of applications after notification is displayed)

Problem in that user does not notice (Reliability number 3-1) Not applicable above As above, description is made while showing an example in which three major classifications are performed. In the second embodiment, it is possible to perform a process based on an assumption in which the classification is performed. For example, in such a case, the relevant classification and the satisfied condition are determined, and a score corresponding to the relevant classification and the satisfied condition is generated as information which is included in a reply. The process is the same process as in the first embodiment.

In the case of the second embodiment, classification may not be performed and scores corresponding to respective reliability numbers may be set with one classification as below.

(Reliability number 1) User is currently watching according to a camera image (continued)

(Reliability number 2) User is currently watching according to a camera image (only recently)

(Reliability number 3) User is currently performing an operation (Reliability number 4) User often immediately notices based on determination of a past history (in a case of a user interface on which the user performs some kinds of application after notification is displayed)

(Reliability number 5) User has recently performed an operation (Reliability number 6) User often notices a little late according to determination based on past history (case of a user interface which causes a user to perform some kinds of application after displaying notification)

As above, when one classification is performed and conditions corresponding to reliability numbers 1 to 6 are set, any one of the conditions of reliability numbers 1 to 6 which is satisfied is determined in step S334. Further, a score according to a result of the determination is generated as information which is included in the reply. In this case, it is not necessary to generate information related to classification and it is not necessary to cause the information to be included in the replay, only the score may be included in the reply.

Meanwhile, when it is determined that none of the conditions which are set for reliability numbers 1 to 6 is satisfied, it is determined that there is a problem in that the user does not notice, and the score is set to 0.

Each of the scores which are calculated in steps S332 to S334 is transmitted to the apparatus which transmits the response request in step S335. The transmitted score includes a matching degree score, a score related to privacy information display, and a score of possibility that the user notices which are calculated in steps S332 to S334.

As above, on the side of the apparatus which receives the response request, scores indicative of the degrees of satisfying the conditions are calculated as described above, and a response is provided.

As described with reference to FIG. 15, the side of the apparatus which detects the event generation selects an apparatus which has a high score from among apparatuses from which the response has arrived in step S306. Scores which are referred to when the selection is performed are scores which are calculated in the process which is described with reference to FIG. 16.

Similarly to the first embodiment, when a prescribed event is generated, it is possible to provide notification of the event generation to the user using an appropriate apparatus in a state in which privacy is protected in the second embodiment.

Operation of System According to Third Embodiment

The first embodiment and the second embodiment are based on the premise that the apparatus, which responds to the response request from the apparatus which detects the event generation, is innocuous. When the apparatus, which responds to the response request from the apparatus which detects the event generation, is nocuous, information, such as notification possibility or score, which is included in the replay, is intentionally deceived and is set for the apparatus which provides notification, and thus it is possible to steal a glance at the privacy information of the user.

A third embodiment will be described in which a section that prevents privacy information from being stolen a glance by the nocuous apparatus is provided, and in which, when a prescribed event is generated, notification of the event generation is provided using an apparatus which is appropriate for the user in a state in which privacy is protected, similarly to the first embodiment and the second embodiment.

Figure 17:
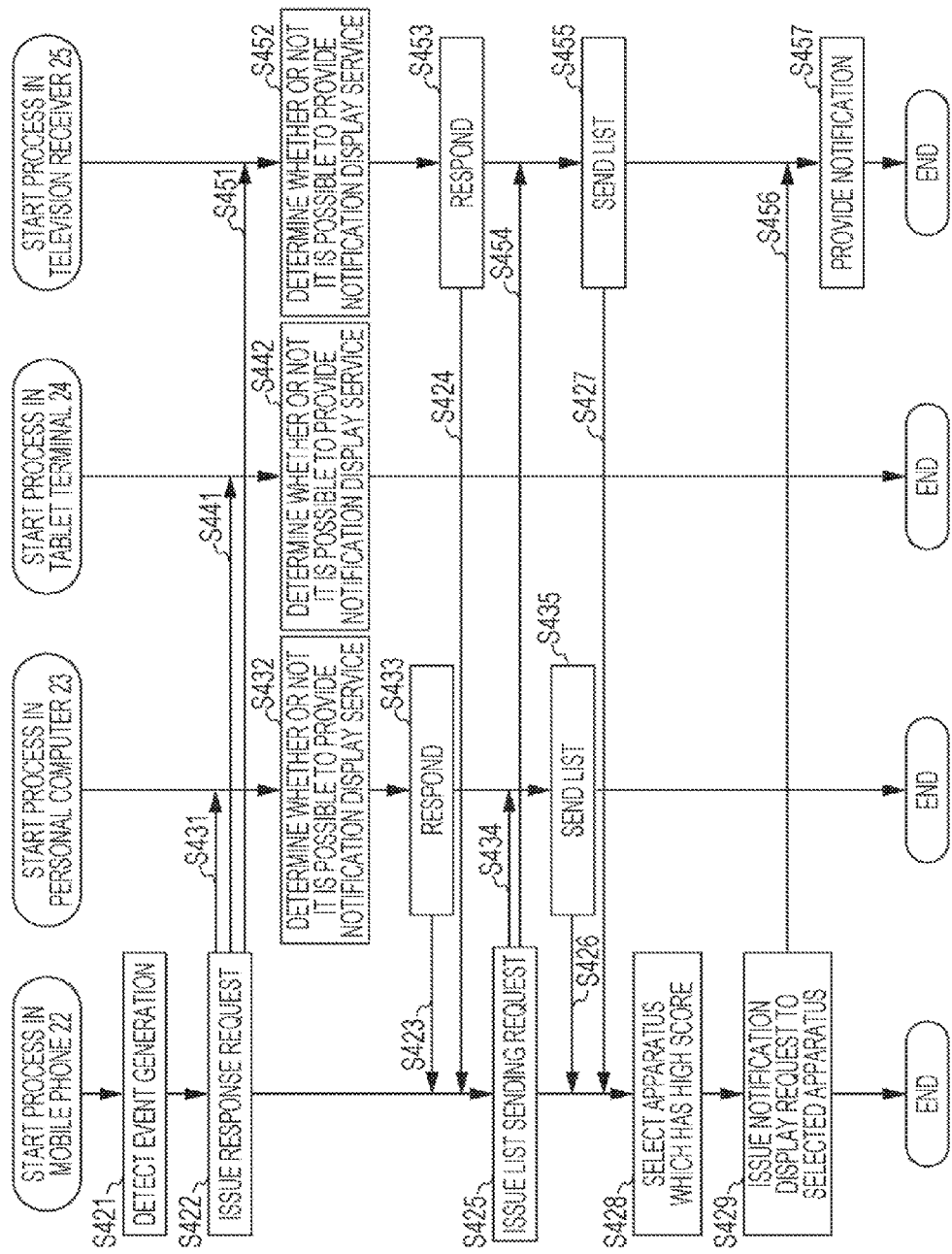
FIG. 17 is a diagram illustrating an operation performed by a system according to a third embodiment.

FIG. 17 is a flowchart illustrating a process which is performed in the system shown in FIG. 1 according to the third embodiment. Description with reference to the flowchart shown in FIG. 17 is made based on an example in which the mobile phone 22 detects event generation and the television receiver 25 provides notification of the event generation.

The mobile phone 22 detects event generation in step S421. For example, reception of an electronic mail is detected as an event. When the mobile phone 22 detects the event generation, the mobile phone 22 issues a response request to apparatuses which are connected to the network 10 in step S422.

In the example shown in FIG. 17, the response request is issued from the mobile phone 22 to the personal computer 23, the tablet terminal 24, and the television receiver 25. The response request causes an apparatus, which is capable of providing a service for providing notification of the event generation to the user, to respond.

Unlike the first embodiment and the second embodiments, the response request does not include user specifying information or priority information, and simply includes only an instruction to cause an apparatus, which is capable of providing a service, to respond in the third embodiment. Accordingly, at this point in time, the privacy or the like of a notification target user is not leaked.

In the above-described first embodiment and the second embodiment, description is made such that the response request is issued to the apparatus, which issues the response request, that is, in this case, the mobile phone 22. In the third embodiment, it is possible to cause the response request to be issued to the apparatus which issues the response request, and it is possible to cause the response request not to be issued to the apparatus which issues the response request in the third embodiment.

The reason for this is that there is a possibility that the privacy information is detected at the point in time in which the event generation is detected. Further, since it is possible to detect event generation, it is conceivable that it is possible to provide a service for providing notification of the event generation to the user.

The personal computer 23 receives the response request from the mobile phone 22 in step S431, and determines whether or not it is possible to provide a notification display service in step S432.

The tablet terminal 24 receives the response request from the mobile phone 22 in step S441, and determines whether or not it is possible to provide a notification display service in step S442.

The television receiver 25 receives the response request from the mobile phone 22 in step S451, and determines whether or not it is possible to provide a notification display service in step S452.

As above, each of the apparatuses, which receive the response request, determines whether or not it is possible to provide the notification display service. Further, when it is possible to provide the notification display service, the apparatus responds.

The determination of whether or not it is possible to provide the notification display service is performed by determining whether or not to satisfy conditions, for example, whether or not secure communication can be performed, whether or not there is sufficient throughput as much as a notification service can be performed even though another process is performed, whether or not a display device is present and it is possible to provide notification, and whether or not an application for providing such a service is stored.

Here, description will be continued based on an assumption in which it is determined that the personal computer 23 and the television receiver 25 can provide the notification display service.

The personal computer 23 sends reply to the mobile phone 22 in step S433. The television receiver 25 sends reply to the mobile phone 22 in step S453. The tablet terminal 24 does not send reply to the mobile phone 22 because it is determined that it is difficult for the tablet terminal 24 to provide the notification display service.

The mobile phone 22 receives respective pieces of reply from the personal computer 23 and the television receiver 25 in steps S423 and S424.

In step S425, the mobile phone 22 issues a list sending request to the apparatuses which sent reply. In this case, the list sending request is issued to the personal computer 23 and the television receiver 25. The list sending request is a request for sending of a list of users to which notification can be provided. The list of users to which notification can be provided will be described with reference to FIG. 18.

FIG. 18 is a table illustrating an example of a list. Meanwhile, FIG. 18 illustrates an easily viewable form for description. However, actually, the list is a table which is recorded in the form, such as a form which is suitable for a computer to process, for example, Java (registered trade mark) Script Object Notation (JSON), Extensible Markup Language (XML), Comma-Separated Values (CSV), or the like.

The list includes a "number (No)", a "user ID", a "facial feature quantity", "whether or not privacy information displayable, score", "whether or not to certainly notice, score", and an "apparatus category" as items.

In the item "user ID", for example, an electronic mail address (the user account part of the electronic mail address), an ID used when login is performed, and the like are recorded. In the example shown in FIG. 18, an example in which the user account part of the electronic mail address is recorded is shown. For example, information "Abcd" is written in the user ID field of number 1, information "Ijkl" is written in the user ID field of number 2, and information "Qrst" is written in the user ID field of number 3.

In the field of the item "user ID", a plurality of IDs maybe recorded. A plurality of IDs which can specify users, for example, an electronic mail address, a login ID to a prescribed site, and a login ID to an additional site may be recorded. In addition, the written user IDs can be IDs which are acquired when apparatuses are operated in the past.

In the item "facial feature quantity", the facial feature quantity of the user is recorded. In the field of the item "facial feature quantity", a feature quantity which is acquired in the past may be written. Since the facial feature quantifies of all the users, to which numbers 1 to 3 are assigned, are not acquired in the example shown in FIG. 18, information "none" is recorded.

In the item "whether or not privacy information displayable, score", a result of determination of whether or not it is a state in which it is possible to provide notification of privacy information, and a score based on the result of the determination are recorded. The result of determination and the score which are recorded in the field are acquired by performing the same process as the process which is performed in, for example, step S134 (FIG. 13).

That is, the determination of whether or not it is possible to display the privacy information, in other words, a condition which is satisfied is determined from among the conditions which are set for the above-described displayable numbers 1 to 3, and a result of the determination and the score are recorded in the field of the item "whether or not privacy information displayable, score".

Accordingly, it is necessary to update the information which is recorded in the field. For example, the determination is performed at the point in time that the list sending request is received, and the result of determination is recorded. In addition, the determination is performed for each user of which the user ID is recorded, and the result of determination and the score are written in a corresponding field.

In the example shown in FIG. 18, a result of determination and a score of "displayable, 50 points" are recorded for the user of number 1, and results of determination of "not displayable" are recorded for the users of number 2 and number 3.

In the item "whether or not to certainly notice, score", a result of determination whether or not the user notices notification and a score are recorded. A result of determination and a score which are recorded in this field are acquired by performing the same process as the process performed in, for example, step S135 (FIG. 13).

That is, it is determined whether or not the user notices notification, in other words, it is determined which condition is satisfied from among the conditions which are set for the above-described reliability numbers, and a result of the determination and a score are recorded in the field of the item "whether or not to certainly notice, score".

Accordingly, it is necessary to update information which is recorded in this field, and such a determination is performed, for example, at a point in time at which the list sending request is received, and a result of the determination is recorded. In addition, the determination is performed for each user, the user ID of which is recorded, and a result of determination and a score are written in a corresponding field.

In the example shown in FIG. 18, a result of determination and a score of "It is slightly difficult to notice, 100 points" are recorded for the user of number 1, and results of determination of "do not notice" are recorded for the users of number 2 and number 3.

In this case, it is determined that the user of number 1 corresponds to a condition "reliability number 2-1: the user has recently performed an operation" of classification of "problem in that it is slightly difficult for the user to notice". Therefore, the example, in which a result of determination and a score of "It is slightly difficult to notice, 100 points" are recorded, is acquired.

In the item "apparatus category", the category of an apparatus which prepares the list (apparatus which maintains the list) is recorded. In the example shown in FIG. 18, a "small screen" is recorded, and thus it is read that the apparatus is classified into an apparatus which has a small screen.

Based on the information which is recorded in the field of the item "apparatus category", the values of scores which are recorded in the fields of the items "whether or not privacy information is displayable, score" and "whether or not to certainly notice, score" may be reduced.

For example, in a case of an apparatus which has a large screen, there is a strong possibility that the user notices. Therefore, a process of changing the score of the item "whether or not to certainly notice, score" into an increased score may be performed. In a case of an apparatus which has a small screen, it is easy to maintain privacy. Therefore, a process of changing the score of the item "whether or not privacy information displayable, score" into an increased score may be performed.

Such a list is prepared as necessary. Timing for preparation includes time at which the list sending request is received, every prescribed period, time at which it is possible to determine that the user is present in the vicinity, and time at which some operations are performed.

Returning to description of the flowchart shown in FIG. 17, the mobile phone 22 issues a list sending request to the personal computer 23 and the television receiver 25 in step S425. The sending of the list sending request is performed through, for example, secure communication such as SSL. In addition, as will be described later, a list is sent from the personal computer 23 or the television receiver 25, and the sending is performed through secure communication such as SSL.

Since the privacy information, such as the user ID, is recorded in the list, it is preferable that the list be transmitted/received through secure communication in order to prevent the privacy information from leaking due to wiretapping. In addition, as described above, there is a possibility that an ill-intentioned apparatus steals the privacy information by impersonating the list. Therefore, it is preferable that secure communication be performed in order to prevent the above situation.

Accordingly, here, description will be continued based on an assumption in which communication, performed when the list sending request is issued, and communication, performed when the list is transmitted and received, are performed as communication in which security is maintained. Meanwhile, although a notification display request is issued in step S429 which will be described later, it is possible to configure the notification display request is performed through communication in which security is maintained.

When the personal computer 23 receives a list sending request from the mobile phone 22 in step S434, the personal computer 23 prepares the list shown in FIG. 18 as necessary, and sends the list to the mobile phone 22 in step S435.

In the same manner, when the television receiver 25 receives a list sending request from the mobile phone 22 in step S454, the television receiver 25 prepares the list shown in FIG. 18 as necessary, and sends the list to the mobile phone 22 in step S455.

The mobile phone 22 receives the list which is transmitted from the personal computer 23 in step S426, and receives the list which is transmitted from the television receiver 25 in step S427.

In step S428, the mobile phone 22 selects an apparatus which has a high score with reference to the received lists. Although details will be described later with reference to FIG. 20, the mobile phone 22 selects an apparatus which has a high score with reference to notification target user relevant information of the received lists.

Here, description will be continued based on an assumption in which the score of the mobile phone 22, the score of the personal computer 23, and the score of the television receiver 25 are acquired and the score of the television receiver 25 is the highest value. In this case, the television receiver 25 is selected as an apparatus which provides notification to the user in step S428.

In step S429, the mobile phone 22 issues a notification display request to the selected apparatus. The notification display request includes notification content, for example, a message for providing notification that a mail is received or information of a subject when information relevant to privacy is also displayed.

The television receiver 25 receives the notification display request from the mobile phone 22 in step S456. Further, the television receiver 25 provides notification to the user based on information included in the notification display request from the mobile phone 22 in step S457.

Since an apparatus which displays notification is selected as above, it is possible to prevent an ill-intentioned apparatus from issuing a notification request, and thus it is possible to prevent privacy information from leaking.

Function of Terminal According to Third Embodiment

Figure 19:
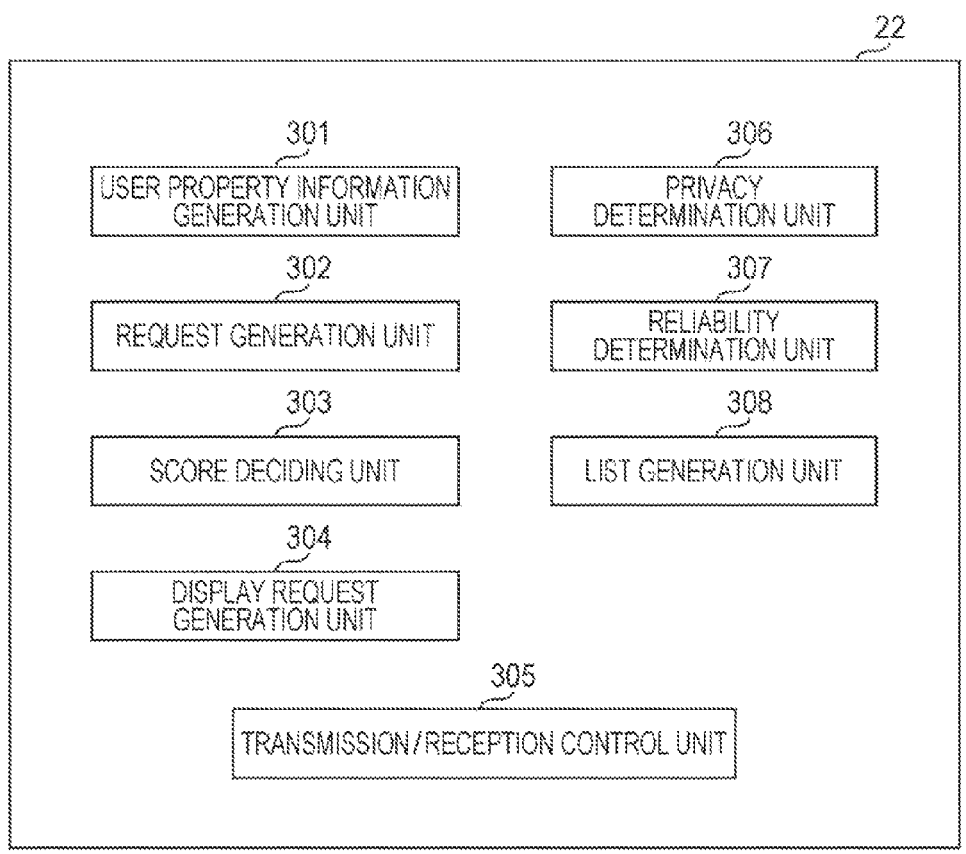
FIG. 19 is a diagram illustrating the functions of the mobile phone.

FIG. 19 is a diagram illustrating the function of a terminal, for example, the mobile phone 22 which performs the process which is described with reference to the flowchart of FIG. 17.

As described above, when one apparatus of the mobile phone 22, the personal computer 23, the tablet terminal 24, and the television receiver 25 detects, for example, prescribed event generation in the system shown in FIG. 1, display for providing notification of the event generation to the user is performed on one apparatus of the mobile phone 22, the personal computer 23, the tablet terminal 24, and the television receiver 25.

In order to realize the event generation, each of the mobile phone 22, the personal computer 23, the tablet terminal 24, and the television receiver 25 includes functions as shown in FIG. 19. Here, although description will be continued based on assumption in which the mobile phone 22 has the functions shown in FIG. 19, the personal computer 23, the tablet terminal 24, and the television receiver 25 have the functions shown in FIG. 19.

The mobile phone 22 includes a user specification information generation unit 301, a request generation unit 302, a score deciding unit 303, a display request generation unit 304, a transmission/reception control unit 305, a privacy determination unit 306, a reliability determination unit 307, and a list generation unit 308.

An operation of the mobile phone 22 which has the functions will be described.

Operation of Terminal According to Third Embodiment

Figure 20:
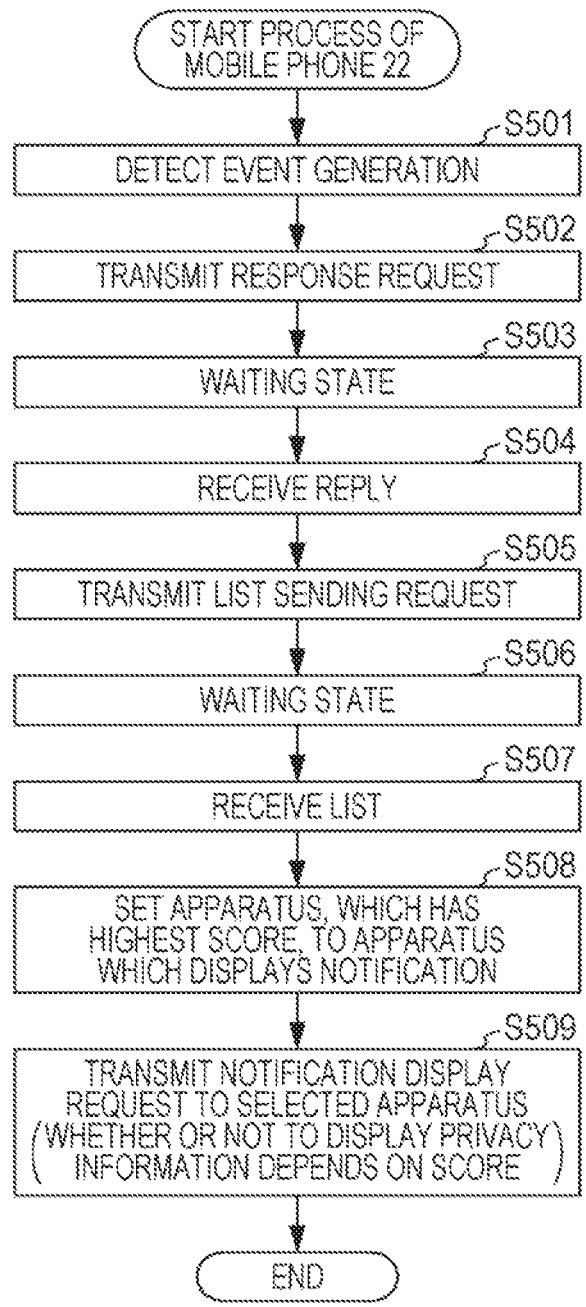
FIG. 20 is a flowchart illustrating an operation performed by a terminal according to the third embodiment.

FIG. 20 is a flowchart illustrating a process performed by a terminal which detects an event according to a third embodiment. Here, description will be continued based on an assumption in which the terminal which detects an event is the mobile phone 22.

In step S501, the mobile phone 22 detects an event, for example, reception of an electronic mail, a reserved starting time, or the like.

In step S502, if the request generation unit 302 (FIG. 19) can provide a notification display service, the request generation unit 302 prepares a response request which includes an instruction to respond. The prepared response request is transmitted to each of the apparatuses by the transmission/reception control unit 305. In this case, the response request is transmitted to the personal computer 23, the tablet terminal 24, and the television receiver 25.

In step S503, the mobile phone 22 is in a waiting state for prescribed time. The waiting state is the time when waiting for a response from the apparatus which transmits the response request. A reply for the response request is received in the waiting state in step S504.

In step S505, the request generation unit 302 (FIG. 19) transmits a list sending request to apparatuses which send the replay. In this case, the list display request is transmitted to the personal computer 23 and the television receiver 25.

In step S506, the mobile phone 22 is in a waiting state for prescribed time. The waiting state is the time when waiting for a response from the apparatus which transmits the list sending request. The list is received in the waiting state in step S507.

In step S508, the score deciding unit 303 (FIG. 19) selects an apparatus which has a high score as an apparatus which displays notification with reference to the received list. When the apparatus is selected, the list is referred to. Information, which matches information for specifying a user who is a notification target generated by the user specification information generation unit 301, is referred to from the list.

For example, a list as shown in FIG. 18 is received and information which is generated by the user specification information generation unit 301 is "Abcd", only information which is recorded in the field of number 1 is referred to and pieces of information of number 2 and number 3 are not referred to.

As above, on the side of the apparatus which detects the event, a user who is a notification target is specified, and it is determined whether or not it is possible to provide notification to the user by referring to a list which is supplied from another apparatus. When an apparatus which provides notification is set by referring to the list, the process proceeds to step S509.

In step S509, a display request is generated by the display request generation unit 304 (FIG. 19). In this case, information, which is included in the display request, is information which includes or does not include privacy information according to a score included in the list from the set apparatus.

For example, if a score for the condition "privacy information displayable" is high, display request information which includes the privacy information is generated.

The apparatus, which detects the event generation as above, performs a process of selecting an apparatus which is suitable for providing notification of the event generation to the user.

Figure 21:
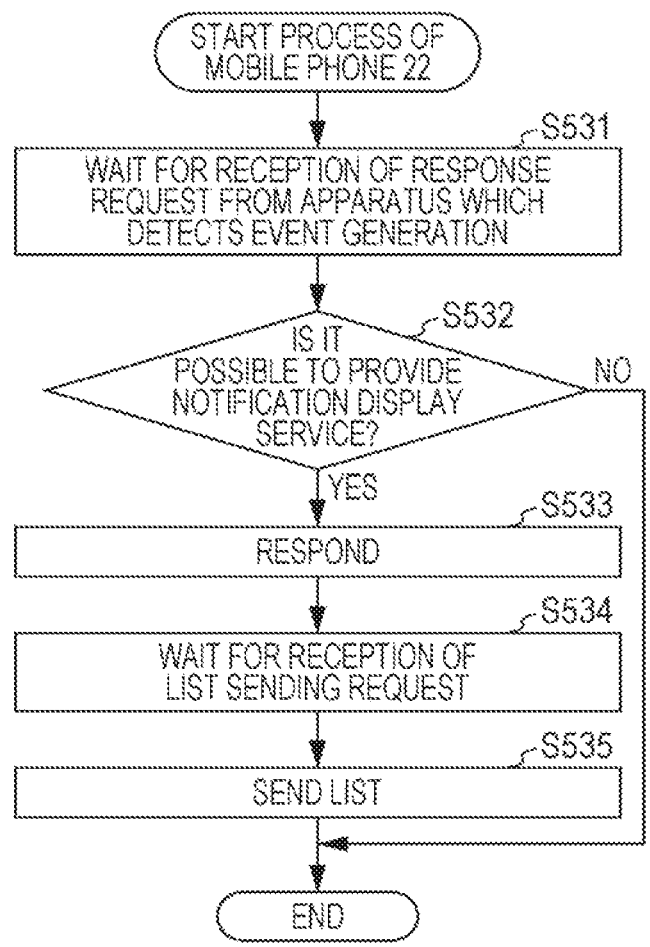
FIG. 21 is a flowchart illustrating an operation performed by the terminal according to the third embodiment.

A process, performed by an apparatus which sends a list, will be described with reference to FIG. 21. Here, there is a possibility that the mobile phone 22 which detects the event generation is an apparatus which performs notification display and the mobile phone 22 prepares the list. Therefore, description will be continued based on an assumption in which the process is performed by the mobile phone 22.

In step S531, the mobile phone 22 is in a state in which the mobile phone 22 waits for the response request from the apparatus which detects the event generation. Further, if the response request is received from the apparatus which detects the event generation, the process proceeds to step S532.

In step S532, it is determined whether or not it is possible to provide a notification display service. When it is determined that it is not possible to provide the notification display service in step S532, it is not necessary to respond, and thus the process of the flowchart shown in FIG. 21 ends.

In contrast, when it is determined that it is possible to provide the notification display service in step S532, the process proceeds to step S533, and a response is provided to the apparatus which transmits the response request. When the response is not provided, the process proceeds to step S534.

In step S534, the mobile phone 22 is in a waiting state until the list sending request is received. Further, when the list sending request is received, the list is transmitted to the apparatus which sends the list sending request in step S535.

The point in time before the list is transmitted, for example, when the mobile phone 22 is in the waiting state until the list sending request is received in step S534, it is determined whether or not it is possible to display privacy information by the privacy determination unit 306 (FIG. 19), and a result of the determination and a score are recorded in the list. In addition, it is determined whether or not the user notices notification by the reliability determination unit 307 (FIG. 19), and a result of the determination and a score are recorded in the list.

As described with reference to FIG. 20, the apparatus which detects the event generation selects an apparatus which has a high score from among apparatuses which transmit the list in step S508. The score, which is referred to when the selection is performed, is a score which is recorded in the list generated in a process described with reference to FIG. 21.

Similarly to the first embodiment and the second embodiment, when a prescribed event is generated, it is possible to provide notification of the event generation to a user using an appropriate apparatus in a state in which privacy is protected in the third embodiment. In addition, in the third embodiment, it is possible to prevent privacy information from being provided to an ill-intentioned apparatus and from being displayed.

Operation of Terminal According to Fourth Embodiment

An example, in which one apparatus which displays notification is selected, is described according to the above-described first to third embodiments. However, a plurality of apparatuses may be selected. For example, when an apparatus which has a small screen is selected as an apparatus which is suitable for displaying notification, it is possible to provide notification of event generation using the apparatus and it is possible to cause another apparatus to display the content of the generated event.

As a fourth embodiment, a case in which a plurality of apparatuses are selected as an apparatus which provides notification will be described as an example. It is possible to perform the same process as those of the first to third embodiments other than the selection of the plurality of apparatuses. Here, a case in which a plurality of apparatuses are selected in the first embodiment will be described as an example.

Figure 22:
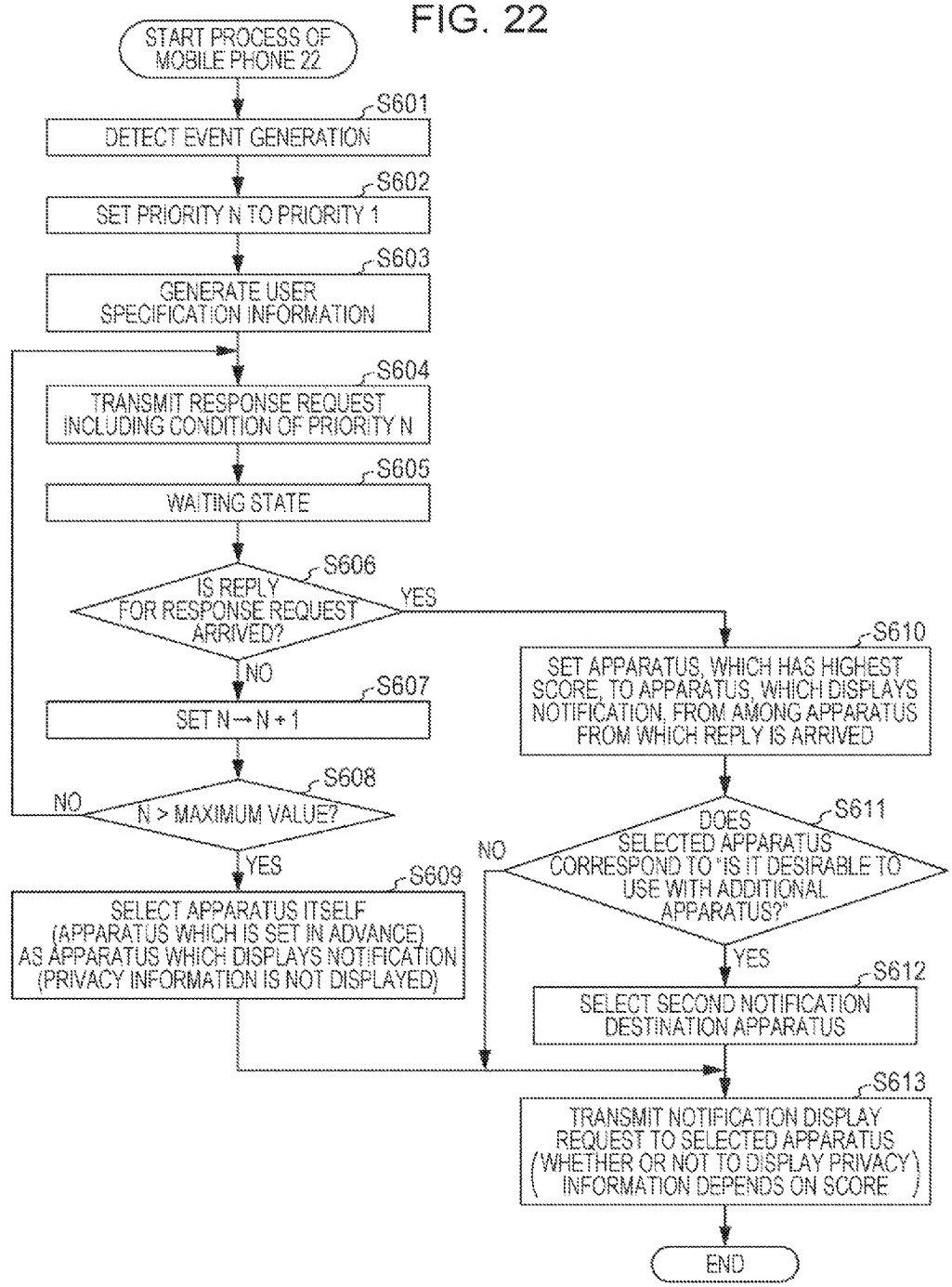
FIG. 22 is a flowchart illustrating an operation performed by a terminal according to a fourth embodiment.

FIG. 22 is a flowchart illustrating an operation of a terminal which performs a process according to the fourth embodiment. A process of selecting a plurality of apparatuses which provide notification is performed on the side of the apparatus which detects the event generation.

A process of the flowchart shown in FIG. 22 is a process in which processes in steps S611 and S612 are added to the process of the flowchart shown in FIG. 12. That is, it is possible to perform the processes in steps S601 to S610 and step S613 of FIG. 22 as the same processes in steps S101 to S111 of FIG. 12. Accordingly, here, the description thereof will not be repeated.

When an apparatus which has the highest score is set as the apparatus which displays notification in step S610, the process proceeds to step S611. In step S611, it is determined whether or not the selected apparatus corresponds to a condition "it is desirable to be used together with an additional apparatus".

In order to enable such a determination, for example, a replay to the response request may include information (flag) "it is desirable to be used together with another apparatus". On a side which receives the reply, the determination in step S611 is performed with reference to the information (flag) "it is desirable to be used together with another apparatus" which is included in the reply.

An apparatus, which corresponds to the condition "it is desirable to be used together with another apparatus", includes, for example, a glasses-type terminal (not shown in the drawing). The glasses-type terminal has a small display area, and thus the number of displayable letters and the amount of information are restricted. When the apparatus, which is restricted in the amount of displayable information, is selected as an apparatus which provides notification, there is a possibility that the restriction is exceeded if the privacy information, such as a subject and sender, is displayed in addition to, for example, a message "electronic mail is received".

Here, for example, a message "an electronic mail is received" is displayed on the glasses-type terminal and privacy information, such as a subject and a sender, is displayed on the mobile phone 22. As above, a process, performed when a plurality of terminals provide notification, is included in the fourth embodiment.

When it is determined that the selected apparatus corresponds to the condition "it is desirable to be used together with another apparatus" in step S611, the process proceeds to step S612. In step S612, a second notification destination apparatus is selected.

The second notification destination apparatus in step S612 is an apparatus which "enables the privacy information to be displayed" and "does not correspond to the condition in which it is desirable to be used together with another apparatus". It is possible to determine whether or not the condition "enables the privacy information to be displayed" is satisfied by determining whether or not conditions which are set for priority 1, priority 2, or priority 5 according to the above-described embodiment.

An apparatus which satisfies the two conditions is selected as the second notification destination apparatus in step S612.

Meanwhile, when the apparatus which satisfies the two conditions is not detected, the process proceeds without the second notification destination apparatus.

When the second notification destination apparatus is selected in step S612, the process proceeds to step S613. In step S613, the notification display request is transmitted to the selected apparatus.

When process proceeds from step S612 to step S613, that is, when the second notification destination apparatus is selected, the display request is issued to each of the first notification destination apparatus and the second notification destination apparatus. At this time, as described above, for example, a request to display a message which provides notification of the event generation is issued to the first notification destination apparatus and a request to display privacy information is issued to the second notification destination apparatus.

In contrast, when it is determined that the selected apparatus does not correspond to the condition "it is desirable to be used together with another apparatus" in step S611, the process in step S612 is skipped, and the process proceeds to step S613.

When the process proceeds from step S611 to step S613, one apparatus is selected as a notification destination apparatus, and thus the display request is issued to the apparatus.

As above, one or two apparatuses are selected as notification destination apparatuses. Meanwhile, here, an example in which two apparatuses are selected is described but the number of notification destination apparatuses is not limited two. When a plurality of apparatuses are selected, it is possible to apply the fourth embodiment.

As above, when a prescribed event is generated, it is possible to provide notification of the event generation to the user using an appropriate apparatus in a state in which privacy is protected in the fourth embodiment.

According to the present disclosure, when an event, such as arrival notification of a mail or a message, is generated, the event generation is displayed in consideration of privacy in a state in which it is possible to display privacy information, and it is possible to provide notification using a terminal in which there is a strong possibility that the user certainly notices the notification.

Accordingly, it is possible to prevent a disadvantage in that the user loses communication timing. In addition, it is possible to prevent the sense of use from being deteriorated (feeling of a hindrance) because a person other than the user views notification.

Recording Medium

The above-described series of processes can be performed by hardware or software. When the series of processes are performed by software, a program which forms the software is installed in a computer. Here, the computer includes a computer which is incorporated with dedicated hardware or, for example, a general-purpose personal computer which can perform various functions by installing various programs.

For example, in the personal computer 23 which is formed as shown in FIG. 3, the above-described series of processes are performed in such a way that the CPU 101 loads, for example, a program which is stored in the storage unit 108 to the RAM 103 through the input/output interface 105 and the bus 104 and executes the program.

The program which is executed by the computer (CPU 101) can be provided after being stored in, for example, the removable medium 111 as a package medium. In addition, the program can be provided through a wired or wireless transmission medium such as a local area network, the Internet, or a digital satellite service.

In the computer, the program can be installed in the storage unit 108 through the input/output interface 105 by mounting the removable medium 111 to the drive 110. In addition, the program can be received by the communication unit 109 through a wired or wireless transmission medium and can be installed in the storage unit 108. In addition, the program can be installed in advance in the ROM 102 or the storage unit 108.

Meanwhile, a program which is executed by the computer may be a program in which the process is chronologically performed in order described in the specification, or may be a program in which the process is performed at necessary timing in which a call is performed.

In addition, in the specification, the system indicates an entire apparatus which is formed by a plurality of apparatuses.

Meanwhile, the advantages which are described in the specification are only examples and are not limited. In addition, another advantage may be provided.

Meanwhile, embodiments of the present disclosure are not limited to the above-described embodiments, and various modifications are possible without departing from the gist of the present disclosure.

Meanwhile, the present disclosure may include configurations as below.

(1) An information processing apparatus includes: a search unit that searches for an apparatus, which is suitable for providing event notification, when event generation is detected; and a supply unit that supplies notification content to the apparatus which is found by the search unit.

(2) In the information processing apparatus of (1), the search unit searches for an apparatus which is in a state capable of displaying privacy information and for which there is a strong possibility that a user notices the notification.

(3) In the information processing apparatus of (1) or (2), the search unit issues a response request for responding to a search target apparatus when a third condition, which includes a first condition relevant to display of the privacy information and a second condition relevant to whether or not the user notices the notification, is satisfied, and sets an apparatus, which has the highest score for satisfying the third condition, to an apparatus, which is suitable for providing the event notification, from among apparatuses which respond to the response request.

(4) In the information processing apparatus of (3), a plurality of third conditions are set by combining the first condition and the second condition, priorities are allocated based on a preferable condition, the response request is issued to the apparatus in order of high priorities, and the response request is issued under the third condition of subsequent priority when there is no apparatus which responds.

(5) In the information processing apparatus of (3), the response request includes information for specifying a notification target user.

(6) In the information processing apparatus of (1) or (2), the search unit transmits information for specifying a notification target user to a search target apparatus, receives a score indicative of a degree of satisfying the condition, which includes a first condition relevant to display of the privacy information and a second condition relevant to whether or not the user notices the notification, from the apparatus, and sets an apparatus which has the highest score as an apparatus, which is suitable for providing the event notification.

(7) In the information processing apparatus of (1) or (2), the search unit issues a response request for responding whether or not it is possible to provide notification to a search target apparatus, receives a table in which scores indicative of a degree of satisfying a condition, which includes a first condition relevant to display of privacy information and a second condition relevant to whether or not a user notices the notification, are written with regard to an apparatus which responds to the response request, and searches for an apparatus, which has the highest score for the notification target user, with reference to the table, and sets the found apparatus as an apparatus which is suitable for providing the event notification.

(8) In the information processing apparatus of (1) or (2), the search unit searches for another apparatus when the found apparatus is restricted in the amount of displayable information, and the supply unit supplies the notification content to each of a plurality of apparatuses.

(9) An information processing method includes: searching for an apparatus, which is suitable for providing event notification, when event generation is detected; and supplying notification content to the found apparatus.

(10) A computer-readable program causes a computer to perform a process including: searching for an apparatus, which is suitable for providing event notification, when event generation is detected; and supplying notification content to the found apparatus.

(11) An information processing apparatus includes: a reception unit that receives a third condition, which includes a first condition relevant to display of privacy information and a second condition relevant to whether or not a user notices notification, from an apparatus which detects event generation; a transmission unit that transmits a score indicative of a degree of satisfying the third condition to the apparatus when it is determined that the third condition is satisfied; and a notification unit that provides notification to the user when notification content is received from the apparatus.

(12) In the information processing apparatus of (11), the score includes at least a score indicative of a degree of whether or not it is possible to display the privacy information, and a score indicative of a degree of a possibility that a notification target user notices the notification.

(13) In the information processing apparatus of (11) or (12), the reception unit receives the third condition in a state in which a plurality of third conditions are set by combining the first condition and the second condition, priorities are allocated based on a preferable condition, and a response request is issued in order of high priorities, and receives the third condition, which is issued in a subsequent priority, again when there is no apparatus which responds.

(14) An information processing method includes: receiving a third condition, which includes a first condition relevant to display of privacy information and a second condition relevant to whether or not a user notices notification, from an apparatus which detects event generation; transmitting a score indicative of a degree of satisfying the third condition to the apparatus when it is determined that the third condition is satisfied; and providing the notification to the user when notification content is received from the apparatus.

(15) A computer-readable program causes a computer to perform a process including: receiving a third condition, which includes a first condition relevant to display of privacy information and a second condition relevant to whether or not a user notices notification, from an apparatus which detects event generation; transmitting a score indicative of a degree of satisfying the third condition to the apparatus when it is determined that the third condition is satisfied; and providing the notification to the user when notification content is received from the apparatus.

(16) An information processing apparatus includes: a reception unit that receives information for specifying a user, to which notification of event generation is provided, from an apparatus which detects event generation; a calculation unit that calculates respective degrees of satisfying a first condition relevant to display of privacy information and a second condition relevant to whether or not the user who is specified using the information notices notification; a transmission unit that transmits a score which is calculated by the calculation unit; and a notification unit that provides notification to the user when notification content is received from the apparatus.

(17) An information processing method includes: receiving information for specifying a user, to which notification of event generation is provided, from an apparatus which detects the event generation; calculating respective degrees of satisfying a first condition relevant to display of privacy information and a second condition relevant to whether or not the user who is specified using the information notices notification; transmitting a calculated score; and providing notification to the user when notification content is received from the apparatus.

(18) An information processing apparatus includes: a reception unit that receives a response request relevant to whether or not it is possible to provide notification of event generation from an apparatus which detects the event generation; a response unit that responds to the response request when it is possible to provide the notification; a preparation unit that prepares a table in which scores, acquired by respectively calculating degrees of satisfying a first condition relevant to display of privacy information and a second condition relevant to whether or not a prescribed user notices the notification, are written as a result of the response; a transmission unit that transmits the table prepared by the preparation unit to the apparatus; and a notification unit that provides notification to the user when notification content is received from the apparatus.

(19) An information processing method includes: receiving a response request relevant to whether or not it is possible to provide notification of event generation from an apparatus which detects the event generation; responding to the response request when it is possible to provide the notification; preparing a table in which scores, acquired by respectively calculating degrees of satisfying a first condition relevant to display of privacy information and a second condition relevant to whether or not a prescribed user notices the notification, are written as a result of response; transmitting the prepared table to the apparatus; and providing notification to the user when notification content is received from the apparatus.

(20) A computer-readable program causes a computer to perform a process including: receiving a response request which indicates whether or not it is possible to provide notification of event generation from an apparatus which detects the event generation; responding to the response request when it is possible to provide the notification; preparing a table in which scores, acquired by respectively calculating degrees of satisfying a first condition relevant to display of privacy information and a second condition relevant to whether or not a prescribed user notices the notification, are written as a result of response; transmitting the prepared table to the apparatus; and providing notification to the user when notification content is received from the apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a transmission control unit configured to transmit a third condition to an apparatus which provides a notification, wherein the third condition comprises a first condition relevant to display of privacy information and a second condition relevant to the notification;
   a reception control unit configured to receive a score from the apparatus based on a determination that the third condition is satisfied, wherein the score is indicative of a degree of satisfaction of the third condition; and
   a display request generation unit configured to generate event notification content, wherein the transmission control unit is further configured to transmit the event notification content to the apparatus based on the received score.

2. The information processing apparatus according to claim 1, wherein the score comprises:
   at least a score indicative of a degree of a possibility to display the privacy information, and
   at least a score indicative of a degree of a possibility that a user notices the notification.

3. The information processing apparatus according to claim 1, wherein the transmission control unit is further configured to:
   transmit the third condition in a state in which a plurality of third conditions are set based on a combination of the first condition and the second condition, a plurality of priorities are allocated based on a condition, and a response request is issued to the apparatus that have a higher priority among the allocated plurality of priorities; and
   transmit the third condition, which is issued with a priority subsequent to a priority of the apparatus that have the higher priority, again based on non-responsiveness of the apparatus.

4. The information processing apparatus according to claim 1, further comprising a face recognition unit configured to recognize a face of a user who notices the notification.

5. The information processing apparatus according to claim 1, further comprising a user specification information generation unit configured to generate user specification information that specifies a user who is a target to which the notification is provided.

6. The information processing apparatus according to claim 5, wherein the user specification information comprises a facial feature quantity of a face of the user.

7. An information processing method, comprising:
   transmitting a third condition to an apparatus configured to provide a notification, wherein the third condition comprises a first condition relevant to display of privacy information and a second condition relevant to the notification;
   receiving a score indicative of a degree of satisfaction of the third condition from the apparatus based on a determination that the third condition is satisfied;
   generating event notification content; and
   transmitting the event notification content to the apparatus based on the received score.

8. An information processing apparatus, comprising:
   a transmission control unit configured to transmit information to an apparatus which provides a notification, wherein the information specifies a user to which the notification of an event generation is provided;
   a reception control unit configured to receive a score based on a calculation of respective degrees of satisfaction of a first condition relevant to display of privacy information and a second condition relevant to the notification; and
   a display request generation unit configured to generate event notification content, wherein the transmission control unit is further configured to transmit the event notification content to the apparatus based on the received score.

9. An information processing method, comprising:
   transmitting information to an apparatus configured to provide a notification, wherein the information specifies a user to which the notification of an event generation is provided;
   receiving a score calculated based on a calculation of respective degrees of satisfaction of a first condition relevant to display of a privacy information and a second condition relevant to the notification;
   generating event notification content; and
   transmitting the event notification content to the apparatus based on the received score.

10. An information processing apparatus, comprising:
    a transmission control unit configured to transmit a response request to an apparatus which provides a notification, wherein the response request is relevant to the notification of an event generation;
    a reception control unit configured to receive a response from the apparatus based on the response request, wherein the response comprises a table in which a plurality of scores are written, wherein the plurality of scores are acquired by respective calculation of degrees of satisfaction of a first condition relevant to display of privacy information and a second condition relevant to the notification; and
    a display request generation unit configured to generate event notification content, wherein the transmission control unit is further configured to transmit the event notification content to the apparatus based on the received response.

11. An information processing method, comprising:
    transmitting a response request to an apparatus configured to provide a notification, wherein the response request is relevant to the notification of an event generation;

receiving a response from the apparatus, wherein the response comprises a table in which a plurality of scores are written, wherein the plurality of scores are acquired by respective calculation of degrees of satisfaction of a first condition relevant to display of privacy information and a second condition relevant to the notification;
generating event notification content; and
transmitting the event notification content to the apparatus based on the received response.

* * * * *